US007672356B2

(12) United States Patent
Kline et al.

(10) Patent No.: US 7,672,356 B2
(45) Date of Patent: Mar. 2, 2010

(54) METHOD AND APPARATUS FOR DETECTION OF A FREQUENCY CODED SEQUENCE IN THE PRESENCE OF SINUSOIDAL INTERFERENCE

(75) Inventors: David R. Kline, Cedar Grove, NJ (US); Paul A. Gilmour, Bloomfield, NJ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 983 days.

(21) Appl. No.: 11/132,338

(22) Filed: May 19, 2005

(65) Prior Publication Data

US 2006/0262831 A1 Nov. 23, 2006

(51) Int. Cl.
*H04B 1/00* (2006.01)

(52) U.S. Cl. .................. 375/136; 375/130; 375/132; 375/137

(58) Field of Classification Search ................ 375/136, 375/130, 132
See application file for complete search history.

(56) References Cited

U.S. PATENT DOCUMENTS

| | | | |
|---|---|---|---|
| 3,858,117 A | | 12/1974 | Denny |
| 4,355,399 A | | 10/1982 | Timor |
| 4,554,509 A | | 11/1985 | Cornett |
| 4,597,087 A | | 6/1986 | Kadin |
| 4,723,310 A | | 2/1988 | De Corlieu et al. |
| 4,956,644 A | | 9/1990 | Leahy et al. |
| 5,163,071 A | | 11/1992 | Gelin |
| 5,204,642 A | | 4/1993 | Asghar et al. |
| 5,432,814 A | * | 7/1995 | Hasegawa .................... 375/133 |
| 5,625,641 A | * | 4/1997 | Takakusaki .................. 375/137 |
| 5,852,630 A | * | 12/1998 | Langberg et al. ............. 375/219 |
| 5,970,086 A | * | 10/1999 | Epstein et al. ............... 375/219 |
| 6,148,020 A | | 11/2000 | Emi |
| 6,288,618 B1 | | 9/2001 | Stevenson et al. |
| 6,320,896 B1 | | 11/2001 | Jovanovich et al. |
| 6,335,946 B1 | * | 1/2002 | Winnberg .................... 375/132 |
| 6,493,398 B1 | * | 12/2002 | Erisman ...................... 375/295 |
| 6,597,725 B1 | * | 7/2003 | Ishii .......................... 375/136 |
| 7,167,504 B1 | * | 1/2007 | Mower et al. ................ 375/142 |
| 7,336,695 B1 | * | 2/2008 | Hendershot ................. 375/132 |

(Continued)

FOREIGN PATENT DOCUMENTS

EP 305125 A1 3/1989

(Continued)

*Primary Examiner*—Shuwang Liu
*Assistant Examiner*—Kenneth Lam
(74) *Attorney, Agent, or Firm*—Edell, Shapiro & Finnan, LLC

(57) ABSTRACT

A communication device according to the present invention detects a frequency-hopped signal in an environment including sinusoidal interference. The frequency-hopped signal includes a frequency shift keying (FSK) sequence, where the sequence alternates between frequencies shifted from the carrier signal or hop frequency by positive and negative frequency offsets. The communication device of the present invention uses independent detection paths for each of the shifted frequencies. In the detection path for the upper frequency (e.g., positive frequency shift), a series of filters suppresses signals in the lower frequency band (e.g., negative frequency shift), while the detection path for the lower frequency employs a separate series of filters to suppress signals in the upper frequency band. The filter outputs from each detection path are separately examined to detect the presence of an expected signal.

31 Claims, 14 Drawing Sheets

U.S. PATENT DOCUMENTS

| | | | |
|---|---|---|---|
| 2002/0122465 A1* | 9/2002 | Agee et al. | 375/141 |
| 2003/0108085 A1* | 6/2003 | Keller et al. | 375/145 |
| 2004/0081248 A1* | 4/2004 | Parolari | 375/259 |
| 2004/0146124 A1 | 7/2004 | Shiung | |
| 2004/0146125 A1 | 7/2004 | Shiung | |
| 2004/0190663 A1 | 9/2004 | Carsello et al. | |
| 2005/0003828 A1* | 1/2005 | Sugar et al. | 455/456.1 |
| 2006/0098719 A1* | 5/2006 | Baltersee et al. | 375/148 |
| 2006/0222179 A1* | 10/2006 | Jensen et al. | 380/252 |

FOREIGN PATENT DOCUMENTS

| | | |
|---|---|---|
| EP | 637882 A1 | 2/1995 |
| GB | 2267417 A | 1/1993 |

* cited by examiner

FIG.3

| Fhop + 1852 Hz | Fhop − 1852 Hz | Fhop + 1852 Hz | Fhop − 1852 Hz |
|---|---|---|---|
| | | | | | X | | X | | | | X | X | | X | X | | X |

FIG.6

| 112 Ts | 96 Ts | 48 Ts | 48 Ts |
|---|---|---|---|
| Fhop + 1852 Hz | Fhop − 1852 Hz | Fhop + 1852 Hz | Fhop − 1852 Hz |
| 1    112 | 113    208 | 209    256 | 257    304 |

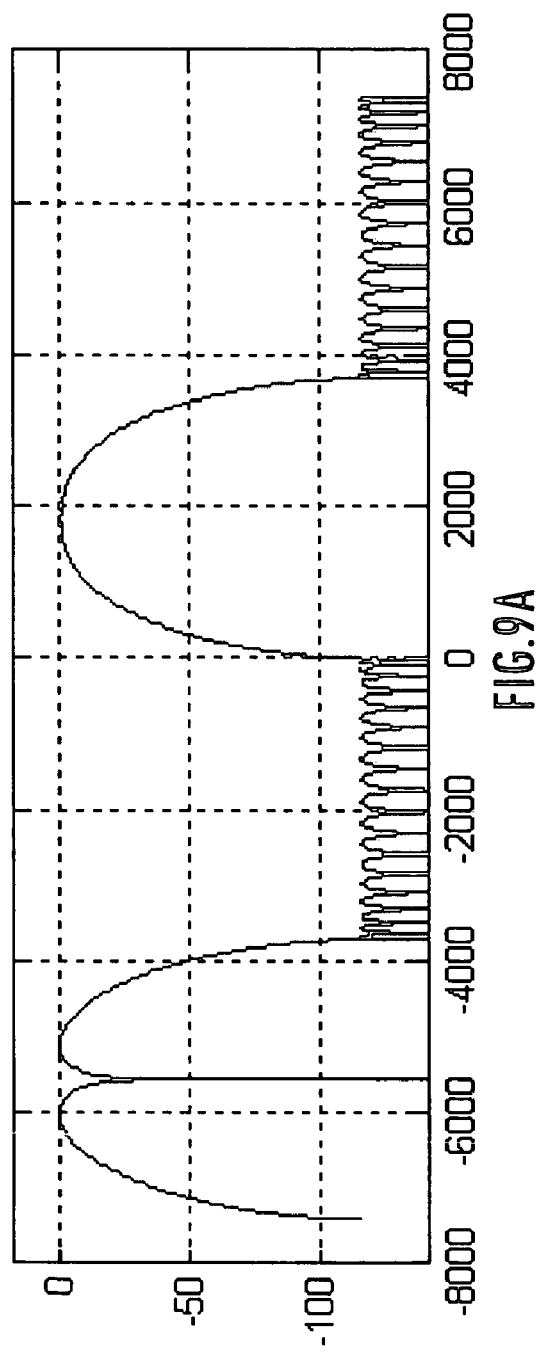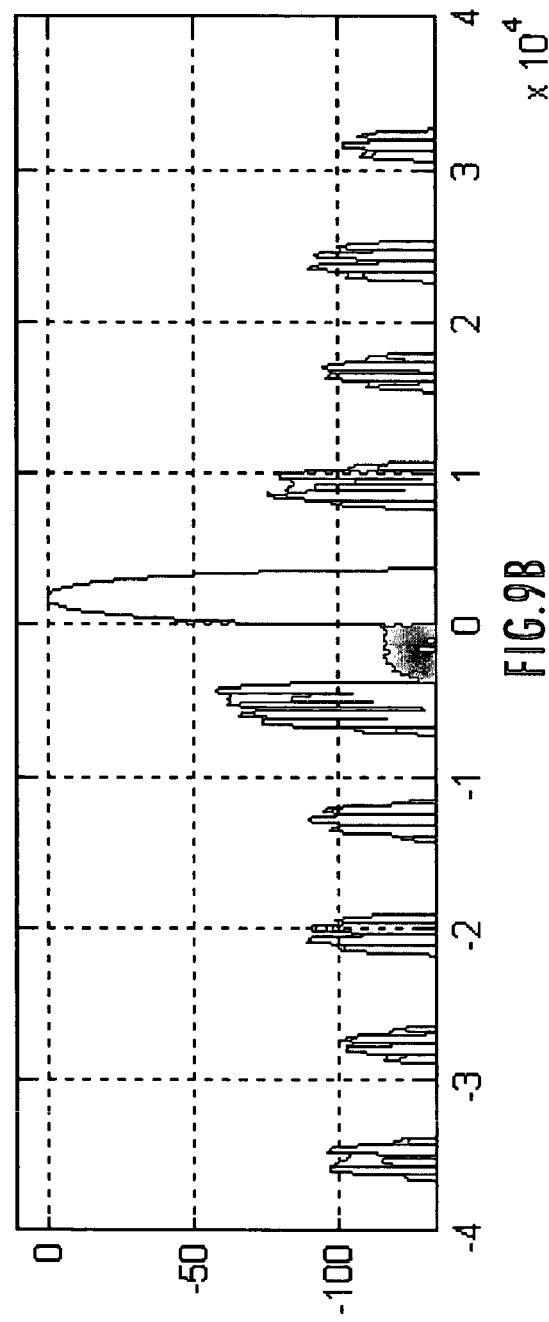

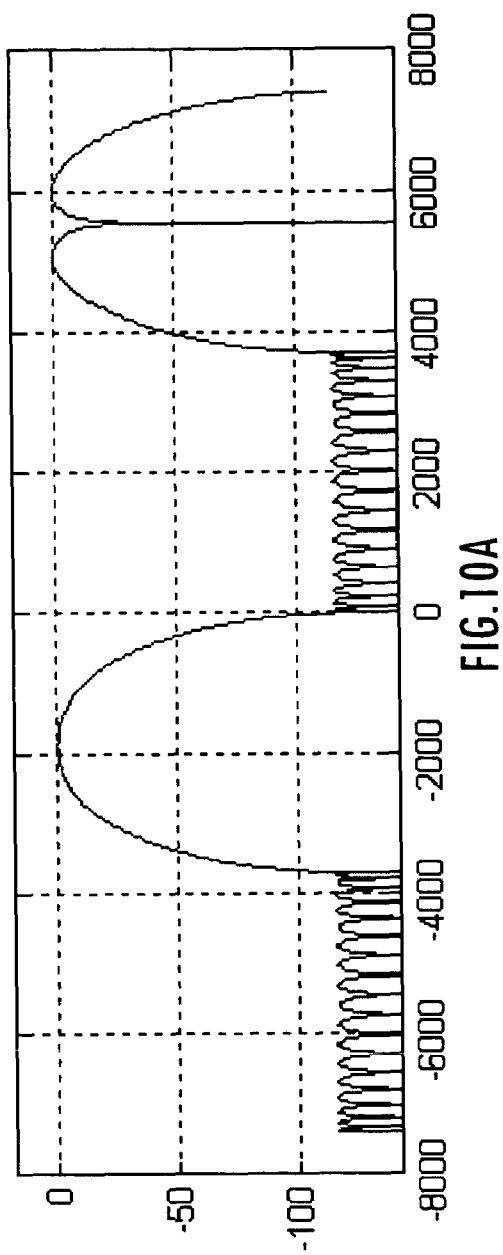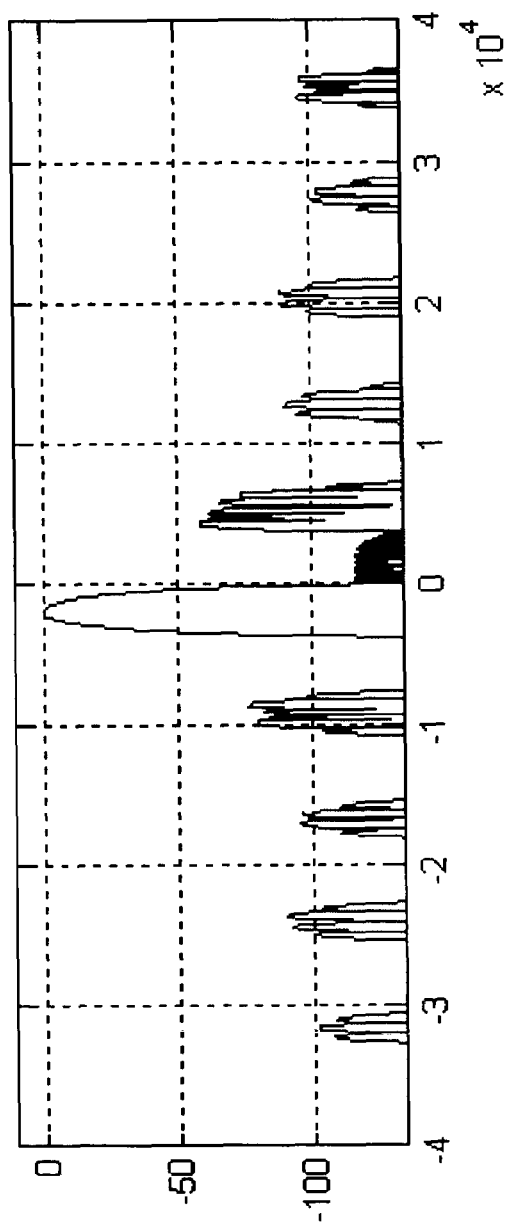

METHOD AND APPARATUS FOR DETECTION OF A FREQUENCY CODED SEQUENCE IN THE PRESENCE OF SINUSOIDAL INTERFERENCE

BACKGROUND OF THE INVENTION

1. Technical Field

The present invention pertains to reception of a frequency-hopped signal. In particular, the present invention pertains to signal detection of a frequency-hopped signal including a frequency shift keying (FSK) sequence in an environment including sinusoidal interference.

2. Discussion of Related Art

A manner of enhancing security and reliability within communication systems includes employment of encoded signals, such as spread spectrum signals. One type of spread spectrum technique is commonly referred to as frequency-hopping. In this type of spread spectrum system, a baseband signal containing the desired information is modulated with a) narrowband carrier signal. The carrier signal is shifted or hopped in frequency based on a spreading or pseudonoise code to spread the modulated signal over a wider bandwidth. The frequency order for transmission of the carrier signal is derived from the code. In order to acquire the spread spectrum signal, a receiving unit is typically required to shift or hop frequencies at a compatible rate in accordance with the spreading code. The frequency-hopped signal may include a frequency shift keying (FSK) sequence (e.g., a sequence employing plural frequencies within the signal) to encode or represent varying states of information. The sequence typically employs alternating frequencies within the signal each displaced or shifted relative to the carrier signal or hop frequency by a frequency offset.

A conventional or legacy receiver for detecting a frequency shift keying sequence (FSK) within a frequency-hopped carrier signal is illustrated in FIG. 1. Specifically, a receiver 10 includes a numerically controlled oscillator (NCO) 12 and a processor 16 to perform signal detection. The frequency of oscillator 12 is adjusted by processor 16 to detect a particular waveform format or sequence within an incoming frequency-hopped signal. The sequence is in the form of a frequency shift keying (FSK) sequence that initially shifts the frequency of the carrier signal or hop by a positive frequency offset and utilizes that frequency (e.g., a hop frequency+1852 Hz) for one-hundred twelve symbol times (Ts), switches to and utilizes a subsequent frequency shifted from the carrier signal or hop frequency by a negative frequency offset (e.g., the hop frequency−1852 Hz) for ninety-six symbol times, reverts back to the initial frequency (e.g., the hop frequency+1852 Hz) for forty-eight symbol times, and subsequently switches to the frequency displaced from the carrier signal or hop frequency by the negative frequency offset (e.g., the hop frequency−1852 Hz) for forty-eight symbol times.

The incoming frequency-hopped carrier signal with the FSK sequence is initially received by the legacy receiver. The received signal and the signal produced by oscillator 12 are provided to processor 16 for processing. In particular, the processor correlates the received and oscillator signals. The correlated output is integrated over sixteen symbol times with the resultant energy being stored. The integration results in nineteen energy values for a hop of three-hundred four symbols (e.g., the sum of the symbols within each frequency shift of the carrier signal FSK sequence (112+96+48+48=304 symbols), where each energy level is integrated over sixteen symbol times, thereby producing nineteen energy levels (304/16=19) for the sequence). When the correlation is viewed as a filter, integration over sixteen symbols, rather than the entire three-hundred four symbols, within the hop widens the bandwidth. This enables some frequency offset in the received signal to be tolerated without causing missed signal detections. The frequency response of the sixteen symbol "boxcar" type filter corresponding to the symbol integration process is illustrated in FIG. 2.

Once the energy values are determined, the energy measurements or values corresponding to locations adjacent (e.g., on either side of) the frequency transition points or shifts of the FSK sequence (e.g., the end of a previous frequency shift and the beginning of the next frequency shift) are discarded as illustrated in FIG. 3 (e.g., the discarded energy values are indicated by the character 'X' as viewed in the figure, where the energy values represent integration of sixteen symbols as described above). These energy values are discarded since the values may be contaminated by data with an incorrect frequency value due to the exact time of arrival (TOA) of the received signal not being precisely known.

The energy values associated with the same frequency are combined to form respective summations (e.g., a summation corresponding to energy measurements associated with the hop frequency+1852 Hz, a summation corresponding to energy measurements associated with the hop frequency−1852 Hz, etc.). The greater summation is determined and utilized to produce a normalization of the lesser summation. The normalization is basically the result of the lesser summation divided by the greater summation. When the normalized summation exceeds a threshold value, the signal is considered detected. The normalization of the lesser summation is required to prevent interference near certain frequencies (e.g., the hop frequency+1852 Hz and the hop frequency−1852 Hz) from causing a false detection in the absence of a valid signal.

The legacy receiver suffers from several disadvantages. In particular, the legacy receiver signal detection fails to detect valid signals in the presence of sinusoidal interference. The measured level and frequency where sinusoidal interference causes the legacy receiver signal detection to fail for a signal level of approximately −6 dBm is illustrated in FIG. 4. As viewed in this figure, the level and frequency where the legacy receiver signal detection fails mirrors the frequency response of the sixteen symbol "boxcar" type filter (FIG. 2). The legacy receiver detection is vulnerable near the hop frequency+1852 Hz and at the sidelobes of the boxcar type filter (e.g., near the hop frequency±500 Hz). The reason for the vulnerability is due to the interfering signal affecting one side of the frequency shift keying sequence (e.g., the hop frequency+1852 Hz or the hop frequency−1852 Hz). Accordingly, the normalization of the lesser energy summation suppresses that summation (e.g., the greater summation is enhanced by the interference), thereby preventing the normalized summation from exceeding the threshold level. Further, the legacy receiver signal detection discards energy values, thereby increasing vulnerability to noise and providing greater quantities of missed signal detections and false alarms.

OBJECTS AND SUMMARY OF THE INVENTION

Accordingly, it is an object of the present invention to reliably detect signals in the presence of interference.

It is another object of the present invention to detect signals in the presence of noise and interference while minimizing the probability of false alarms.

Yet another object of the present invention is to detect a frequency-hopped signal in the presence of sinusoidal interference by independently processing frequency shifts of a frequency shift keying (FSK) sequence within the frequency-hopped signal.

The aforesaid objects may be achieved individually and/or in combination, and it is not intended that the present invention be construed as requiring two or more of the objects to be combined unless expressly required by the claims attached hereto.

According to the present invention, a communication device detects a frequency-hopped signal in an environment including sinusoidal interference. The frequency-hopped signal includes a frequency shift keying (FSK) sequence, where the sequence alternates between frequencies shifted from the carrier signal or hop frequency by positive and negative frequency offsets (e.g., the hop frequency±1852 Hz). The communication device of the present invention uses independent detection paths for each of the shifted frequencies (e.g., a detection path for the +1852 Hz frequency shift, a detection path for the −1852 Hz frequency shift, etc.). In the detection path for the upper frequency (e.g., +1852 Hz frequency shift), a series of filters suppresses signals in the lower frequency band (e.g., within the negative frequency offset), while the detection path for the lower frequency (e.g., −1852 Hz frequency shift) employs a separate series of filters to suppress signals in the upper frequency band (e.g., within the positive frequency offset). The filter outputs from each detection path are separately examined to detect the presence of an expected signal. The present invention is preferably applied for signal detection within modems, and minimizes the probability of false detections (e.g., false alarms) due to noise and interference, thereby maximizing the probability of detecting valid signals.

The present invention provides several advantages. For example, the present invention employs a finite impulse response (FIR) bandpass filter that provides far superior suppression of out-of-band signals than the legacy receiver. By way of example, the energy within the band of an opposing frequency shift may be suppressed by more than 100 dB. Further, the present invention locates the optimum time alignment and, therefore, operates without discarding energy values at the frequency shift or transition edges. This results in enhanced performance in the presence of noise. Moreover, the present invention utilizes independent detection paths for the shifted frequencies (e.g., a detection path for the +1852 Hz frequency shift, a detection path for the −1852 Hz frequency shift, etc.), thereby preventing interference from affecting one side of the frequency shift keying sequence (e.g., the +1852 Hz frequency shift or the −1852 Hz frequency shift) and suppressing the other sequence side. Accordingly, the present invention avoids signal detection failures for interference above 8 dBm levels and provides enhanced false alarm performance relative to the legacy receiver.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 3 is a diagrammatic illustration of integration results for a frequency shift keying (FSK) sequence of a frequency-hopped signal that are discarded for signal detection in the legacy receiver.

FIG. 6 is a diagrammatic illustration of an exemplary waveform format of a frequency-hopped signal detected by the present invention.

FIG. 9A is a graphical illustration of the frequency response of a high band filter employed by the signal processor of FIG. 7.

FIG. 9B is a graphical illustration of the frequency response of the combination of the low pass and high band filters employed by the signal processor of FIG. 7.

FIG. 10A is a graphical illustration of the frequency response of a low band filter employed by the signal processor of FIG. 7.

FIG. 10B is a graphical illustration of the frequency response of the combination of the low pass and low band filters employed by the signal processor of FIG. 7.

DETAILED DESCRIPTION OF THE PREFERRED EMBODIMENTS

Spread spectrum techniques enhance security and reliability within communication systems. One type of spread spectrum communication is commonly referred to as frequency-hopping. Basically, frequency-hopping spread spectrum systems modulate a baseband signal containing desired information with a narrowband carrier signal. The carrier signal is shifted or hopped in frequency based on a spreading or pseudonoise code to spread the modulated signal over a wider bandwidth. The frequency order for transmission of the carrier signal is derived from the code. In order to acquire the spread spectrum signal, a receiving unit is typically required to shift or hop frequencies at a compatible rate in accordance with the spreading code. The frequency-hopped signal may include a frequency shift keying (FSK) sequence (e.g., a sequence employing plural frequencies within the signal) to encode or represent varying states of information. The sequence typically employs alternating frequencies within the signal each displaced or shifted relative to the carrier signal or hop frequency by a frequency offset. However, signal detection within conventional receivers fails to detect the frequency-hopped signal with the frequency shift keying (FSK) sequence in the presence of sinusoidal interference as described above. This is due to the interfering signal affecting one of the alternating frequencies of the frequency shift keying sequence.

Accordingly, the signal detection of the present invention enables detection of a frequency-hopped signal including a frequency shift keying (FSK) sequence in an environment with sinusoidal interference. The present invention signal detection is preferably utilized within modems for satellite communications. However, the present invention may be applied to any suitable communication devices.

Figure 1:
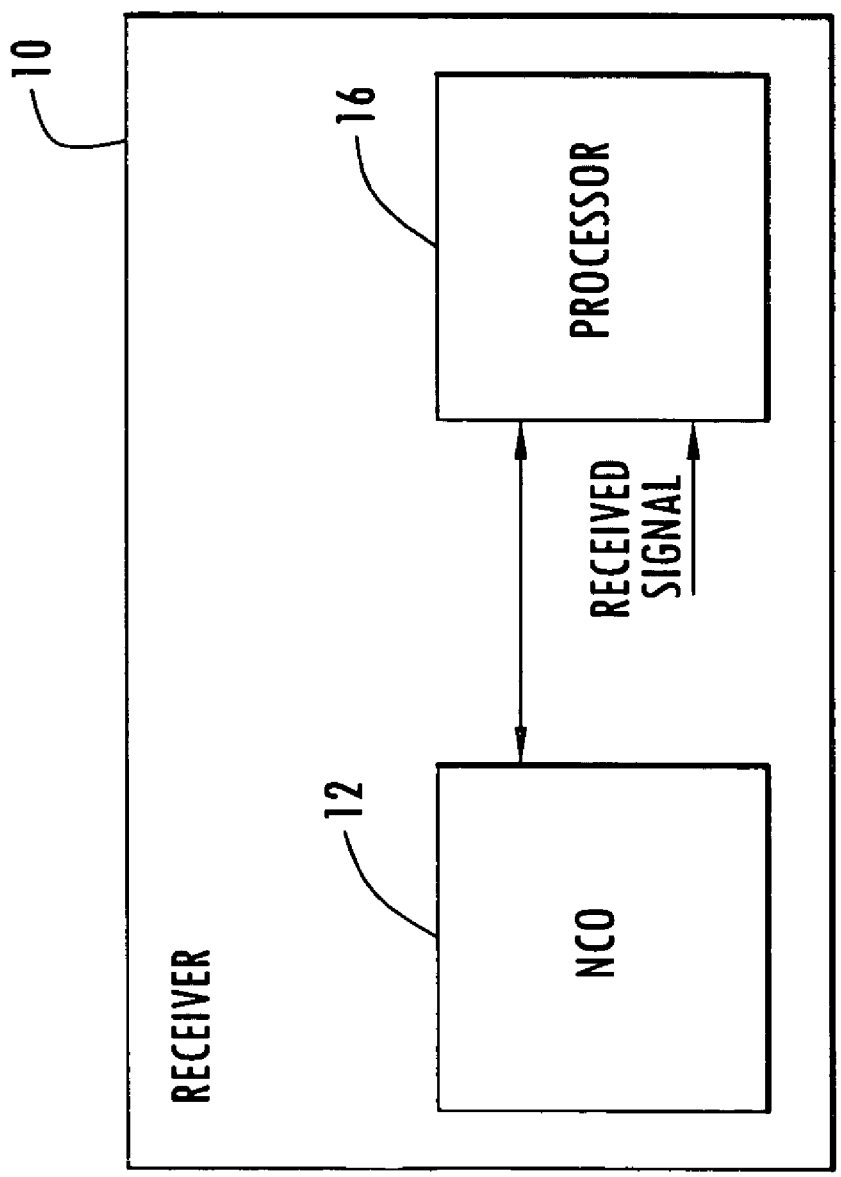
FIG. 1 is a block diagram of a conventional or legacy receiver.
Figure 2:
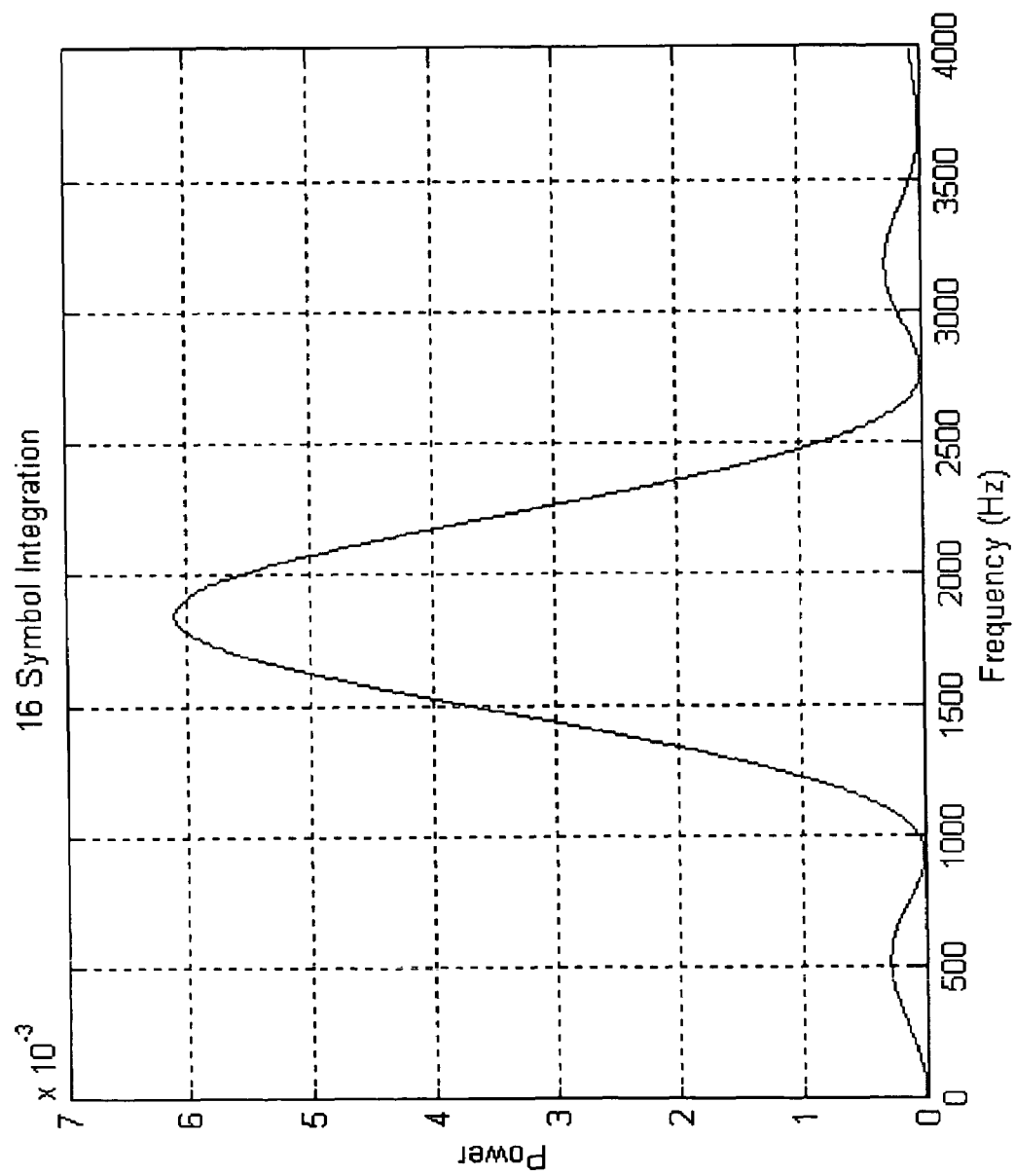
FIG. 2 is a graphical illustration of the frequency response of a boxcar type filter for a sixteen symbol integration.
Figure 4:
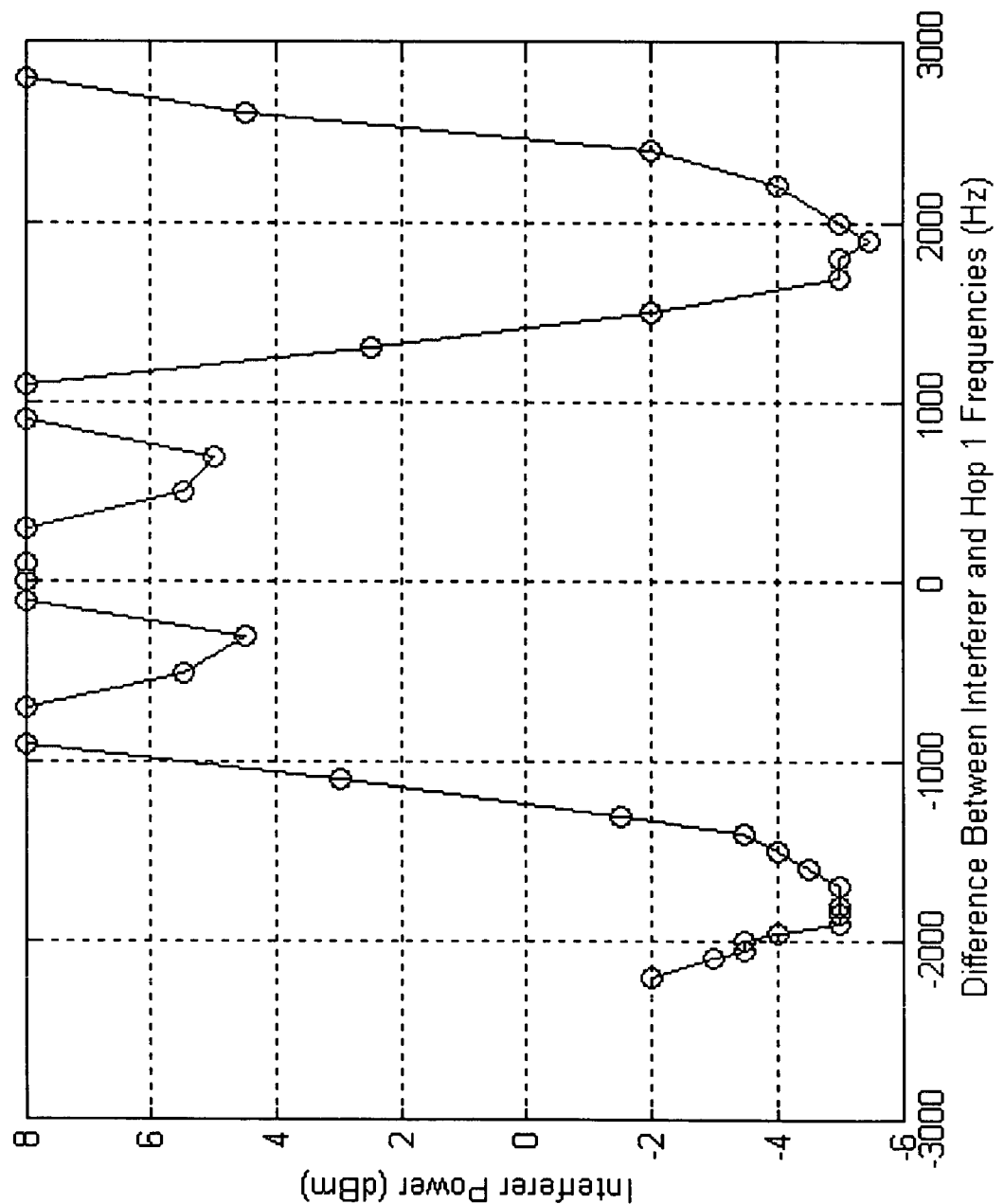
FIG. 4 is a graphical illustration of the power level and frequency of interfering signals indicating the conditions when those signals cause signal detection failure in the legacy receiver.
Figure 5:
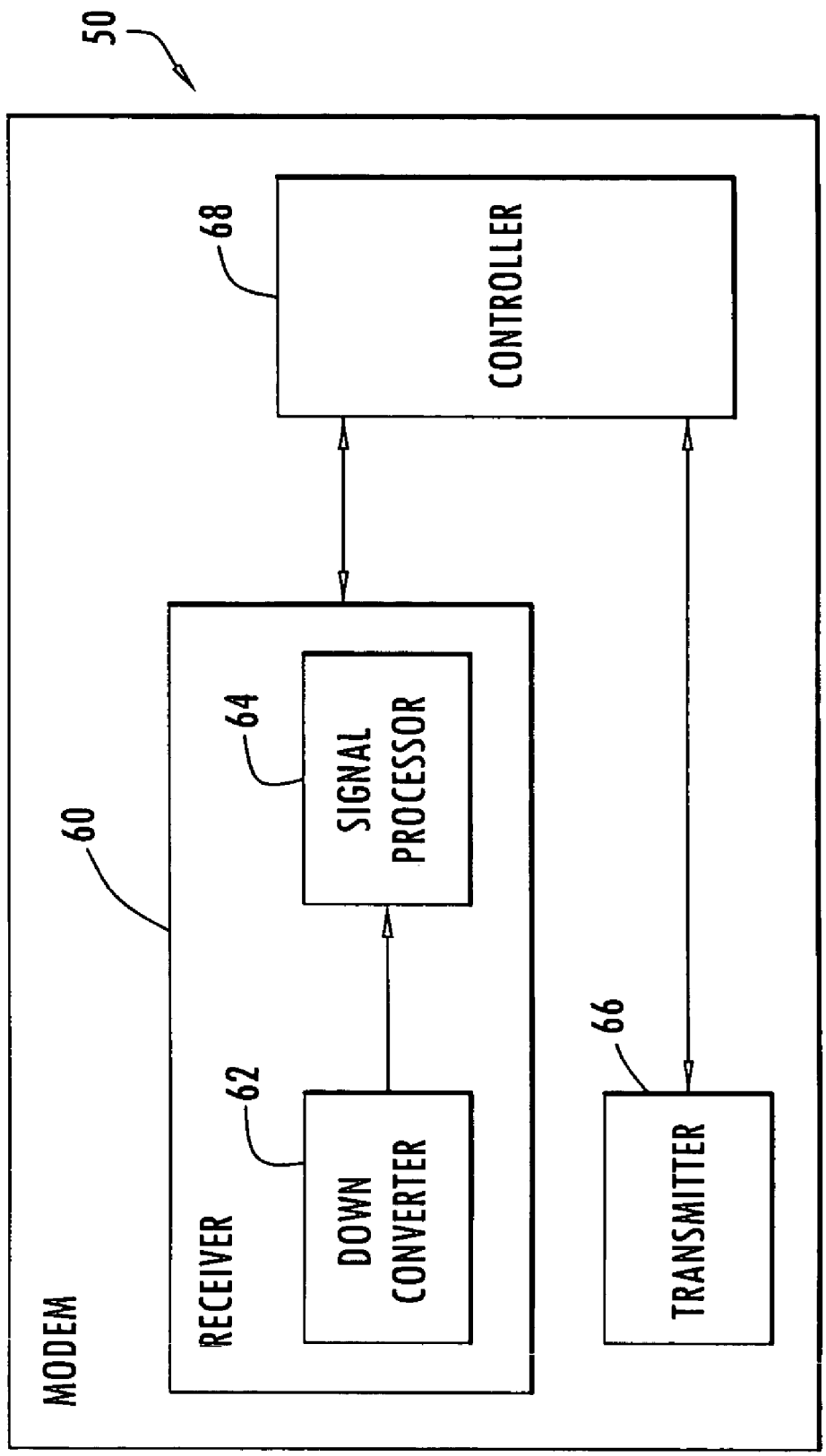
FIG. 5 is a block diagram of an exemplary modem employing signal detection according to the present invention.

An exemplary modem for satellite communications employing signal detection according to the present invention to detect a frequency-hopped signal including a frequency shift keying (FSK) sequence is illustrated in FIG. 5. Specifically, modem 50 includes a receiver 60, a transmitter 66 and a controller 68. The controller is preferably implemented by a conventional microprocessor or controller and controls the modem to transmit and receive signals. The transmitter is preferably implemented by a conventional transmitter and transmits messages or signals, preferably in the form of radio frequency (RF) signals, in accordance with controller instructions.

Receiver 60 performs the signal detection of the present invention and is configured to receive signals in accordance with controller instructions. The received signals are preferably in the form of radio frequency (RF), frequency-hopped, spread spectrum signals including a frequency shift keying (FSK) sequence. The receiver includes down converter 62 and a signal processor 64. The down converter may be implemented by any conventional or other conversion device (e.g., frequency converters, etc.) and down converts an incoming carrier signal to a baseband signal for processing by signal processor 64. The signal processor is preferably implemented by a conventional microprocessor or controller (e.g., digital signal processor, etc.) and performs the signal detection of the present invention as described below.

The present invention signal detection may operate in various environments including white noise, tone jamming with noise, and frequency shift keying (FSK) modulated interference with noise. The tone jamming with noise environment is basically a simulated interference environment, and may arise from unrelated RF systems (e.g., paging systems, etc.) or intentional tone jamming. The FSK environment models the most common type of on-orbit interference (e.g., active FSK pager systems). The present invention preferably allows for a ±877 μsec uncertainty in the time of arrival of waveforms. The signal detection of the present invention may further allow for a residual ±50 Hz variability in a frequency offset estimate. The signal level of the frequency-hopped signal varies over a certain limited range due to changes in the distance between satellites. In addition, production or aging variations in analog front-end gain affects the received signal level. In order to avoid susceptibility to these variations in the signal level, the signal detection of the present invention is virtually gain invariant.

The signal detection of the present invention is based on interference being bandlimited relative to the bandwidth of the signal of interest. In other words, a majority of the interference energy resides either in the positive or negative frequency shifts (e.g., relative to the carrier signal or hop frequency) of the frequency shift keying (FSK) sequence. However, this condition does not apply in the rare case that a modulated waveform carrier frequency is near the carrier hop frequency. The present invention independently performs signal detection for the high (e.g., positive frequency shift) and low (e.g., negative frequency shift) tones within the FSK sequence, preferably at the first hop, where each independent detection removes energy residing within the band of the opposing frequency shift. However, the present invention signal detection may be applied to any quantity of any hops of frequency-hopped transmissions.

An exemplary waveform format of a signal detected by the present invention is illustrated in FIG. 6. By way of example, a signal for detection by the present invention includes a frequency shift keying (FSK) sequence and is transmitted via a frequency-hopping technique. The sequence within the frequency-hopped carrier signal initially shifts the carrier signal or hop frequency by a positive frequency offset and utilizes that frequency (e.g., a hop frequency +1852 Hz) for one-hundred twelve symbol times (Ts), switches to and utilizes a subsequent frequency shifted from the carrier or hop frequency by a negative frequency offset (e.g., the hop frequency −1852 Hz) for ninety-six symbol times, reverts back to the initial frequency (e.g., the hop frequency +1852 Hz) for forty-eight symbol times, and subsequently switches to the frequency displaced from the carrier or hop frequency by the negative frequency offset (e.g., the hop frequency −1852 Hz) for forty-eight symbol times. However, the present invention signal detection may be applied to signals including any desired format (e.g., FSK, including any desired frequency shifts or modulation, etc.) and transmitted via any desired transmission techniques (e.g., frequency hopping, etc.).

Figure 7:
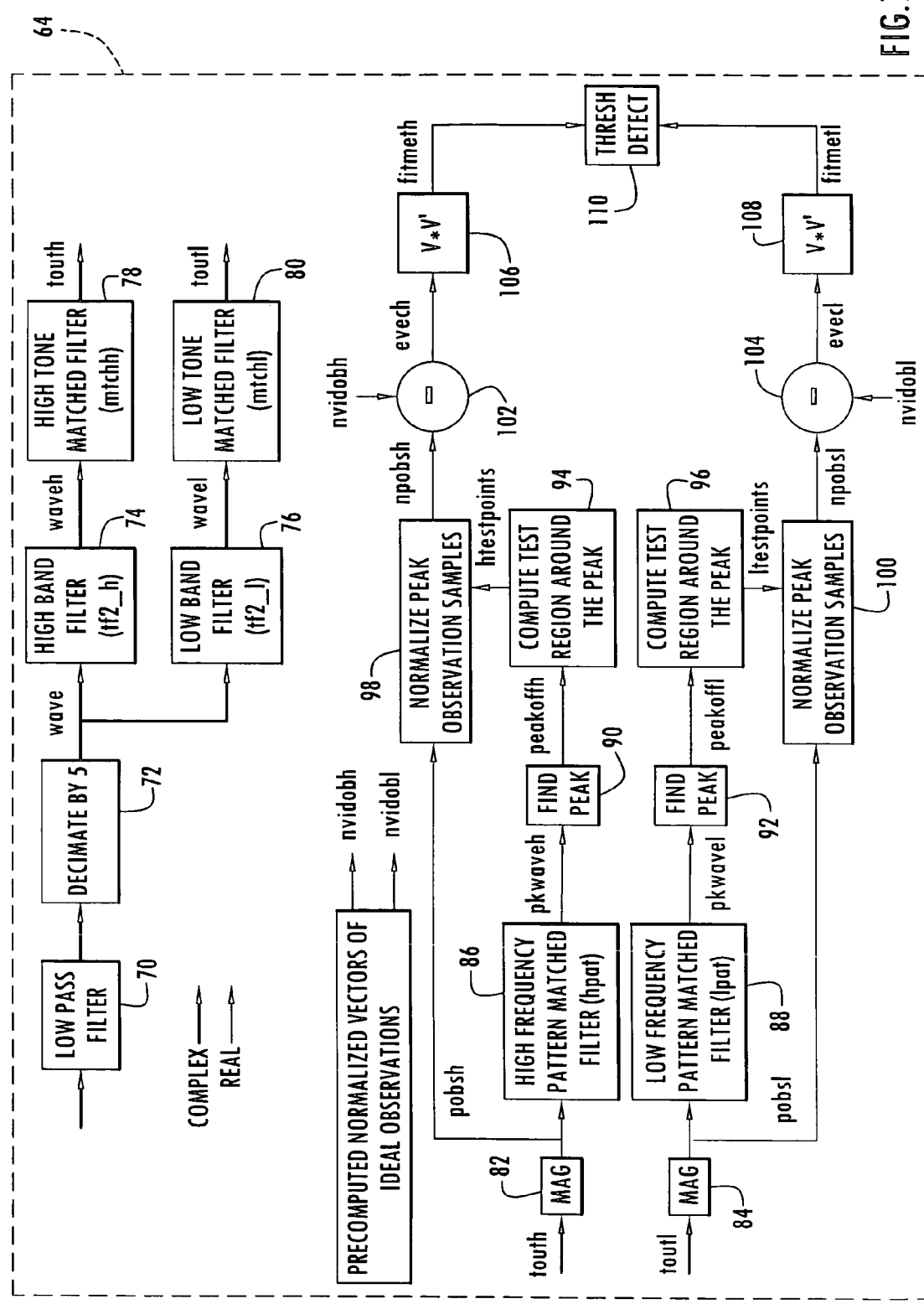
FIG. 7 is a functional block diagram of the signal processor of FIG. 5 illustrating the manner in which a frequency-hopped signal including a frequency shift keying (FSK) sequence is detected according to the present invention.

The manner in which a signal is detected according to the present invention is illustrated in FIG. 7. Initially, an incoming signal is received by modem receiver 60 (FIG. 5), where the incoming signal is preferably a frequency-hopped signal including the frequency shift keying (FSK) format described above (FIG. 6). The incoming signal is down converted from the carrier or hop frequency to a baseband signal by down converter 62 within the receiver. The resulting baseband signal retains the frequency shift keying (FSK) waveform within the carrier signal as described above, where the alternating frequency shifts (±1852 Hz) are displaced relative to the baseband signal frequency. The baseband signal is provided to signal processor 64 of the receiver for signal detection. The present invention may alternatively process the incoming signal at any desired frequency (e.g., carrier signal or hop frequency, an intermediate frequency, baseband frequency, etc.) retaining the frequency shift keying (FSK) waveform in the manner described below to detect the presence of a valid signal.

Figure 8:
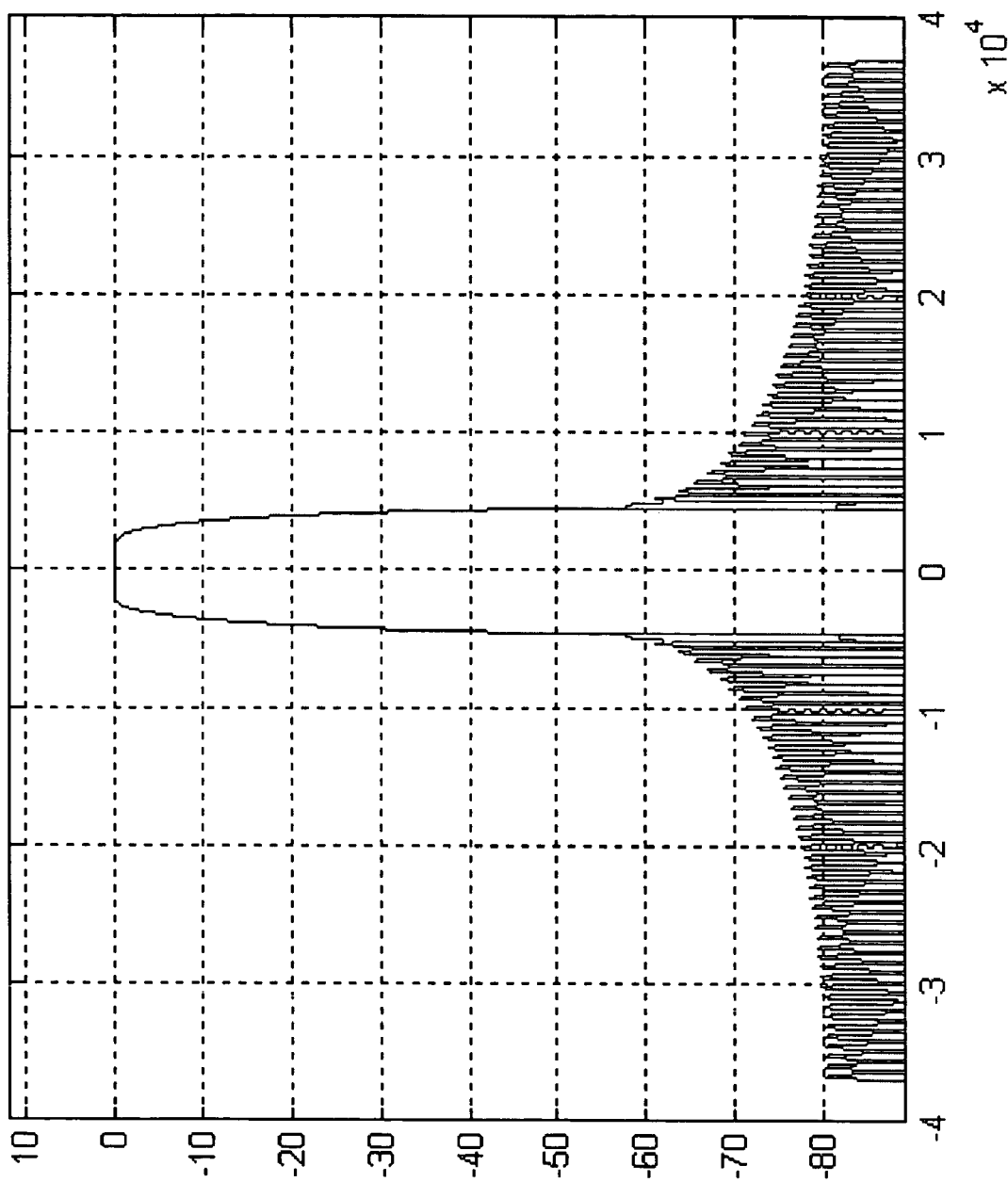
FIG. 8 is a graphical illustration of the frequency response of a low pass filter employed by the signal processor of FIG. 7.

The baseband signal is converted to digital form, where the signal processor preferably includes a series of software modules to process the signal and perform signal detection as described below. The filters of the present invention are preferably implemented by the signal processor as finite impulse response (FIR) digital filters. These types of filters include a filter output produced by the summation of products of current and/or previous inputs or samples multiplied by corresponding coefficients or weights. The inputs used by the filters to produce the filter output are commonly referred to as taps. The coefficients or weights (e.g., real or complex values) associated with the taps or inputs define the frequency response of the filter. In particular, the digitized baseband signal is initially received by a low pass filter 70. The digitized signal information includes complex values (e.g., real and imaginary components). Filter 70 removes any out-of-band waveform that would alias in-band after decimation described below. Filter 70 is preferably implemented by a 102-tap low pass FIR filter (e.g., the filter output is based on a current input or sample and 101 previous inputs or samples) with a 2000 Hz passband and a stop band beginning at 4500 Hz. The frequency response of low pass filter 70 is illustrated in FIG. 8.

The filter may be designed within a simulation tool (e.g., MATLAB available from The Math Works, Inc. of Natick, Mass.) that provides functions for filter design. For example, the low pass filter may be represented by a simulation tool function (e.g., further, described below) utilized to determine filter tap weights or coefficients for the desired filter response. The function parameters include the order of the FIR filter (e.g., an order of one-hundred one), a vector of normalized frequency point pairs (e.g., 0 and 2000, 4500 and fs/2, where fs is the sampling frequency and each of these points is divided by half the sampling frequency to provide a normalized frequency range (e.g., from zero to one) representing the range between zero and the Nyquist rate (e.g., twice the sampling frequency)) and a vector of the amplitudes for the points specified in the frequency point vector (e.g., an amplitude of 1 for the 0 and 2000 frequency points, and an amplitude of zero for the remaining frequency points). The low pass filter may be represented by the following exemplary simulation code and corresponding tap coefficients or weights (e.g., the initial tap weight is associated with the current input, while successive tap weights are respectively associated with a corresponding one of the immediately preceding 101 inputs in time order).

Low Pass Filter Parameters:

fs=10e6/135; % sampling freq=74074.074... samples/second lpf=fir1s(101,[0 2000 4500 fs/2]/(fs/2), [1 1 0 0]);

Low Pass Filter Tap Coefficients or Weights:

lpf( 1) = 0.00011971482482460
lpf( 2) = 0.00015924492446724
lpf( 3) = 0.00018269750417486
lpf( 4) = 0.00017800233775514
lpf( 5) = 0.00013375513878732
lpf( 6) = 0.00004121641834363
lpf( 7) = −0.00010359200343351
lpf( 8) = −0.00029797054116072
lpf( 9) = −0.00053111146400924
lpf( 10) = −0.00078345277643653
lpf( 11) = −0.00102706610811007
lpf( 12) = −0.00122723949408248
lpf( 13) = −0.00134529196518849
lpf( 14) = −0.00134250826461413
lpf( 15) = −0.00118492362848281
lpf( 16) = −0.00084853838519017
lpf( 17) = −0.00032441937352609
lpf( 18) = 0.00037693182724770
lpf( 19) = 0.00122258000407749
lpf( 20) = 0.00215610839674130
lpf( 21) = 0.00309897551524205
lpf( 22) = 0.00395453450765005
lpf( 23) = 0.00461472256498253
lpf( 24) = 0.00496914430469205
lpf( 25) = 0.00491598339717760
lpf( 26) = 0.00437391138655618
lpf( 27) = 0.00329395255675744
lpf( 28) = 0.00167013665840048
lpf( 29) = −0.00045225108597478
lpf( 30) = −0.00297191858601089
lpf( 31) = −0.00573119691387982
lpf( 32) = −0.00852061400737240
lpf( 33) = −0.01108856900600176
lpf( 34) = −0.01315580732819682
lpf( 35) = −0.01443392895662026
lpf( 36) = −0.01464672866487981
lpf( 37) = −0.01355281137510156
lpf( 38) = −0.01096768782452384
lpf( 39) = −0.00678346539246994
lpf( 40) = −0.00098432374575075
lpf( 41) = 0.00634379272662830
lpf( 42) = 0.01501043754204503
lpf( 43) = 0.02472553063644812
lpf( 44) = 0.03511187983782195
lpf( 45) = 0.04572476757780531
lpf( 46) = 0.05607740571541326
lpf( 47) = 0.06567053327660652
lpf( 48) = 0.07402403517070967
lpf( 49) = 0.08070823362049259
lpf( 50) = 0.08537247233007755
lpf( 51) = 0.08776878300584459
lpf( 52) = 0.08776878300584459
lpf( 53) = 0.08537247233007755
lpf( 54) = 0.08070823362049259
lpf( 55) = 0.07402403517070967
lpf( 56) = 0.06567053327660652
lpf( 57) = 0.05607740571541326
lpf( 58) = 0.04572476757780531
lpf( 59) = 0.03511187983782195
lpf( 60) = 0.02472553063644812
lpf( 61) = 0.01501043754204503
lpf( 62) = 0.00634379272662830
lpf( 63) = −0.00098432374575075
lpf( 64) = −0.00678346539246994
lpf( 65) = −0.01096768782452384
lpf( 66) = −0.01355281137510156
lpf( 67) = −0.01464672866487981
lpf( 68) = −0.01443392895662026
lpf( 69) = −0.01315580732819682
lpf( 70) = −0.01108856900600176
lpf( 71) = −0.00852061400737240
lpf( 72) = −0.00573119691387982
lpf( 73) = −0.00297191858601089
lpf( 74) = −0.00045225108597478
lpf( 75) = 0.00167013665840048
lpf( 76) = 0.00329395255675744
lpf( 77) = 0.00437391138655618
lpf( 78) = 0.00491598339717760
lpf( 79) = 0.00496914430469205
lpf( 80) = 0.00461472256498253
lpf( 81) = 0.00395453450765005
lpf( 82) = 0.00309897551524205
lpf( 83) = 0.00215610839674130
lpf( 84) = 0.00122258000407749
lpf( 85) = 0.00037693182724770
lpf( 86) = −0.00032441937352609
lpf( 87) = −0.00084853838519017
lpf( 88) = −0.00118492362848281
lpf( 89) = −0.00134250826461413
lpf( 90) = −0.00134529196518849
lpf( 91) = −0.00122723949408248
lpf( 92) = −0.00102706610811007
lpf( 93) = −0.00078345277643653
lpf( 94) = −0.00053111146400924
lpf( 95) = −0.00029797054116072
lpf( 96) = −0.00010359200343351
lpf( 97) = 0.00004121641834363
lpf( 98) = 0.00013375513878732
lpf( 99) = 0.00017800233775514
lpf(100) = 0.00018269750417486
lpf(101) = 0.00015924492446724
lpf(102) = 0.00011971482482460

The complex output values of the low pass filter are provided to decimator 72. The decimator reduces the filter output by a factor of five. In other words, the decimator selects every fifth sample from the low pass filter output. The decimator reduces the effective complexity of the low pass filter since four samples are discarded for each group of five samples. However, the decimator may be configured to reduce the filter output by any desired factor.

The complex output values of decimator 72 (e.g., WAVE as viewed in FIG. 7) are provided to independent detection paths to detect the signal in the high and low regions (e.g., the regions of the positive and negative frequency shifts within the FSK sequence or ±1852 Hz). In particular, the decimator output is provided to a high band filter 74 and to a low band filter 76, each representing the initial stage of the respective detection paths. Each filter is designed to reject the opposite band of frequencies. In other words, the high band filter rejects frequencies in the lower band (e.g., within the −1852 Hz frequency shift), while the low band filter rejects frequencies in the higher band (e.g., within the +1852 Hz frequency shift). The high and low band filters are each basically implemented by substantially the same filter. The filter is designed to enable DC signals to pass, while rejecting signals in the range 1852 Hz to 5556 Hz (3*1852Hz). The frequency band beyond 5556 Hz is ignored in order to reduce the filter tap count (e.g., to forty as described below). The filter is configured to the high or low tone center frequency (±1852 Hz) to implement the respective high and low band filters 74, 76.

The frequency response for high band filter 74 is illustrated in FIG. 9A. The left portion of the high band filter frequency response (e.g., as viewed in FIG. 9A) includes the ignored frequency region (e.g., beyond 5556 Hz). This portion or region of the response imposes the 4500 Hz stop band on low pass filter 70 described above. Thus, increasing the complexity of the high band filter (e.g., increasing the quantity of filter taps), enables the complexity of the low pass filter to be reduced. The combined frequency response of the low pass and high band filters arranged in series is illustrated in FIG. 9B. Energy within image frequencies (e.g., beyond about 7400 Hz) may alias in-band to tone matched filters 78, 80 described below. The frequency responses of the low band filter and the combination of low pass filter 70 and the low band filter are respectively illustrated in FIGS. 10A-10B. The low band filter is symmetric with respect to high band filter 74 about 0 Hz.

The high and low band filters may be designed within a simulation tool (e.g., MATLAB available from The Math-Works, Inc. of Natick, Mass.) that provides functions for filter design. For example, the low pass filter may be represented by a simulation tool function (e.g., remez, described below) utilized to determine filter tap weights or coefficients for the desired filter response in accordance with the conventional Parks-McClellan algorithm. This algorithm utilizes the Remez exchange algorithm and Chebyshev approximation theory to determine tap coefficients or weights providing an optimal fit between the desired and actual frequency response. The function parameters include the order of the filter (e.g., an order of thirty-nine), a vector of normalized frequency point pairs defining frequency bands (e.g., 0 and 50, 1851 and 3*1852, 3.01*1852 and 4*1852, where each of these points is divided by 4*1852 Hz to provide a normalized frequency range (e.g., from zero to one) representing the range between zero and the Nyquist rate (e.g., twice the frequency of the sampled signal)), a vector of the amplitudes for the points specified in the frequency point vector (e.g., an amplitude of 1 for the 0 and 50 frequency points, and an amplitude of zero for the remaining frequency points) and a weight vector to weight the fit in each band (e.g., a weight of one for the band defined by the 0 and 50 frequency points, a weight of 1000 for the band defined by the 1852 and 3*1852 frequency points, and a weight of 0.001 for the remaining band). The high and low band filters may be represented by the following exemplary simulation code and corresponding tap coefficients or weights (e.g., the initial tap weight is associated with the current input, while successive tap weights are respectively associated with a corresponding one of the immediately preceding thirty-nine inputs in time order).

High and Low Band Filter Parameters:

fs=10e6/135/5; % decimated sampling freq=14814.81481 ... samples/second fh=10e6/5400; % 1851.851 ... Hz fl=−10e6/5400;

tf2=remez(39,[0 50 fh 3*fh 3.01*fh 4*fh]/(4*fh),[1 1 0 0 0 0],[1 1000 0.001])

tf2_h=tf2.*exp(j*pi*[1: length(tf2)]*fh/(fs/2));

tf2_l=tf2.*exp(j*pi*[1:length(tf2)]*fl/(fs/2));

HighBand Filter Tap Weights or Coefficients:

Highband filter (tf2_h)

| | |
|---|---|
| Real(tf2_h( 1)) = −0.00011371693020269 | Imag(tf2_h( 1)) = −0.00011371693020269 |
| Real(tf2_h( 2)) = −0.00000000000000000 | Imag(tf2_h( 2)) = 0.00015172960812771 |
| Real(tf2_h( 3)) = 0.00087604223859718 | Imag(tf2_h( 3)) = −0.00087604223859718 |
| Real(tf2_h( 4)) = −0.00128835811006824 | Imag(tf2_h( 4)) = −0.00000000000000000 |
| Real(tf2_h( 5)) = 0.00353811346746708 | Imag(tf2_h( 5)) = 0.00353811346746709 |
| Real(tf2_h( 6)) = 0.00000000000000000 | Imag(tf2_h( 6)) = −0.00573611082812294 |
| Real(tf2_h( 7)) = −0.00969147513551517 | Imag(tf2_h( 7)) = 0.00969147513551517 |
| Real(tf2_h( 8)) = 0.01748557996874064 | Imag(tf2_h( 8)) = 0.00000000000000001 |
| Real(tf2_h( 9)) = −0.01969694495000688 | Imag(tf2_h( 9)) = −0.01969694495000690 |
| Real(tf2_h(10)) = −0.00000000000000002 | Imag(tf2_h(10)) = 0.04037747738939555 |
| Real(tf2_h(11)) = 0.03058250012394913 | Imag(tf2_h(11)) = −0.03058250012394910 |
| Real(tf2_h(12)) = −0.07417727541803307 | Imag(tf2_h(12)) = −0.00000000000000010 |
| Real(tf2_h(13)) = 0.03549679038501945 | Imag(tf2_h(13)) = 0.03549679038501949 |
| Real(tf2_h(14)) = −0.00000000000000005 | Imag(tf2_h(14)) = −0.11104879510155857 |
| Real(tf2_h(15)) = −0.02658599371446838 | Imag(tf2_h(15)) = 0.02658599371446845 |
| Real(tf2_h(16)) = 0.13642794100623240 | Imag(tf2_h(16)) = 0.00000000000000018 |
| Real(tf2_h(17)) = −0.00049763932270486 | Imag(tf2_h(17)) = −0.00049763932270486 |
| Real(tf2_h(18)) = −0.00000000000000017 | Imag(tf2_h(18)) = 0.13596936747873711 |
| Real(tf2_h(19)) = −0.03740471648645618 | Imag(tf2_h(19)) = 0.03740471648645616 |
| Real(tf2_h(20)) = −0.10493231685991466 | Imag(tf2_h(20)) = −0.00000000000000012 |
| Real(tf2_h(21)) = −0.07419835281726087 | Imag(tf2_h(21)) = −0.07419835281726143 |
| Real(tf2_h(22)) = 0.00000000000000006 | Imag(tf2_h(22)) = −0.05289825735186682 |
| Real(tf2_h(23)) = 0.09614486177786083 | Imag(tf2_h(23)) = −0.09614486177786044 |
| Real(tf2_h(24)) = −0.00070376827933938 | Imag(tf2_h(24)) = −0.00000000000000000 |
| Real(tf2_h(25)) = 0.09646912222882483 | Imag(tf2_h(25)) = 0.09646912222882555 |

-continued

| | |
|---|---|
| Real(tf2__h(26)) = 0.00000000000000004 | Imag(tf2__h(26)) = −0.03759827288016709 |
| Real(tf2__h(27)) = −0.07852335605890740 | Imag(tf2__h(27)) = 0.07852335605890767 |
| Real(tf2__h(28)) = 0.05020004238320941 | Imag(tf2__h(28)) = −0.00000000000000004 |
| Real(tf2__h(29)) = −0.05245125445803339 | Imag(tf2__h(29)) = −0.05245125445803339 |
| Real(tf2__h(30)) = 0.00000000000000012 | Imag(tf2__h(30)) = 0.04325018644656570 |
| Real(tf2__h(31)) = 0.02855118806924814 | Imag(tf2__h(31)) = −0.02855118806924804 |
| Real(tf2__h(32)) = −0.02785568668561599 | Imag(tf2__h(32)) = −0.00000000000000007 |
| Real(tf2__h(33)) = 0.01236417216887613 | Imag(tf2__h(33)) = 0.01236417216887621 |
| Real(tf2__h(34)) = 0.00000000000000006 | Imag(tf2__h(34)) = −0.01370581557604718 |
| Real(tf2__h(35)) = −0.00405604286420332 | Imag(tf2__h(35)) = 0.00405604286420330 |
| Real(tf2__h(36)) = 0.00500364805090685 | Imag(tf2__h(36)) = 0.00000000000000001 |
| Real(tf2__h(37)) = −0.00091100675622594 | Imag(tf2__h(37)) = −0.00091100675622594 |
| Real(tf2__h(38)) = −0.00000000000000000 | Imag(tf2__h(38)) = 0.00123891081503582 |
| Real(tf2__h(39)) = 0.00010728903481388 | Imag(tf2__h(39)) = −0.00010728903481388 |
| Real(tf2__h(40)) = −0.00016082002496408 | Imag(tf2__h(40)) = −0.00000000000000000 |

Low Band Filter Tap Coefficients or Weights:
Low band filter (tf2_l)

| | |
|---|---|
| Real(tf2__l( 1)) = −0.00011371693020269 | Imag(tf2__l( 1)) = 0.00011371693020269 |
| Real(tf2__l( 2)) = −0.00000000000000000 | Imag(tf2__l( 2)) = −0.00015172960812771 |
| Real(tf2__l( 3)) = 0.00087604223859718 | Imag(tf2__l( 3)) = 0.00087604223859718 |
| Real(tf2__l( 4)) = −0.00128835811006824 | Imag(tf2__l( 4)) = 0.00000000000000000 |
| Real(tf2__l( 5)) = 0.00353811346746708 | Imag(tf2__l( 5)) = −0.00353811346746709 |
| Real(tf2__l( 6)) = 0.00000000000000000 | Imag(tf2__l( 6)) = 0.00573611082812294 |
| Real(tf2__l( 7)) = −0.00969147513551517 | Imag(tf2__l( 7)) = −0.00969147513551517 |
| Real(tf2__l( 8)) = 0.01748557996874064 | Imag(tf2__l( 8)) = −0.00000000000000001 |
| Real(tf2__l( 9)) = −0.01969694495000688 | Imag(tf2__l( 9)) = 0.01969694495000690 |
| Real(tf2__l(10)) = −0.00000000000000002 | Imag(tf2__l(10)) = −0.04037747738939555 |
| Real(tf2__l(11)) = 0.03058250012394913 | Imag(tf2__l(11)) = 0.03058250012394910 |
| Real(tf2__l(12)) = −0.07417727541803307 | Imag(tf2__l(12)) = 0.00000000000000010 |
| Real(tf2__l(13)) = 0.03549679038501945 | Imag(tf2__l(13)) = −0.03549679038501949 |
| Real(tf2__l(14)) = −0.00000000000000005 | Imag(tf2__l(14)) = 0.11104879510155857 |
| Real(tf2__l(15)) = −0.02658599371446838 | Imag(tf2__l(15)) = −0.02658599371446845 |
| Real(tf2__l(16)) = 0.13642794100623240 | Imag(tf2__l(16)) = −0.00000000000000018 |
| Real(tf2__l(17)) = −0.00049763932270486 | Imag(tf2__l(17)) = 0.00049763932270486 |
| Real(tf2__l(18)) = −0.00000000000000017 | Imag(tf2__l(18)) = −0.13596936747873711 |
| Real(tf2__l(19)) = −0.03740471648645618 | Imag(tf2__l(19)) = −0.03740471648645616 |
| Real(tf2__l(20)) = −0.10493231685991466 | Imag(tf2__l(20)) = 0.00000000000000012 |
| Real(tf2__l(21)) = −0.07419835281726087 | Imag(tf2__l(21)) = 0.07419835281726143 |
| Real(tf2__l(22)) = 0.00000000000000006 | Imag(tf2__l(22)) = 0.05289825735186682 |
| Real(tf2__l(23)) = 0.09614486177786083 | Imag(tf2__l(23)) = 0.09614486177786044 |
| Real(tf2__l(24)) = −0.00070376827933938 | Imag(tf2__l(24)) = 0.00000000000000000 |
| Real(tf2__l(25)) = 0.09646912222882483 | Imag(tf2__l(25)) = −0.09646912222882555 |
| Real(tf2__l(26)) = 0.00000000000000004 | Imag(tf2__l(26)) = 0.03759827288016709 |
| Real(tf2__l(27)) = −0.07852335605890740 | Imag(tf2__l(27)) = −0.07852335605890767 |
| Real(tf2__l(28)) = 0.05020004238320941 | Imag(tf2__l(28)) = 0.00000000000000004 |
| Real(tf2__l(29)) = −0.05245125445803339 | Imag(tf2__l(29)) = 0.05245125445803339 |
| Real(tf2__l(30)) = 0.00000000000000012 | Imag(tf2__l(30)) = −0.04325018644656570 |
| Real(tf2__l(31)) = 0.02855118806924814 | Imag(tf2__l(31)) = 0.02855118806924804 |
| Real(tf2__l(32)) = −0.02785568668561599 | Imag(tf2__l(32)) = 0.00000000000000007 |
| Real(tf2__l(33)) = 0.01236417216887613 | Imag(tf2__l(33)) = −0.01236417216887621 |
| Real(tf2__l(34)) = 0.00000000000000006 | Imag(tf2__l(34)) = 0.01370581557604718 |
| Real(tf2__l(35)) = −0.00405604286420332 | Imag(tf2__l(35)) = −0.00405604286420330 |
| Real(tf2__l(36)) = 0.00500364805090685 | Imag(tf2__l(36)) = −0.00000000000000001 |
| Real(tf2__l(37)) = −0.00091100675622594 | Imag(tf2__l(37)) = 0.00091100675622594 |
| Real(tf2__l(38)) = −0.00000000000000000 | Imag(tf2__l(38)) = −0.00123891081503582 |
| Real(tf2__l(39)) = 0.00010728903481388 | Imag(tf2__l(39)) = 0.00010728903481388 |
| Real(tf2__l(40)) = −0.00016082002496408 | Imag(tf2__l(40)) = 0.00000000000000000 |

Figure 11:
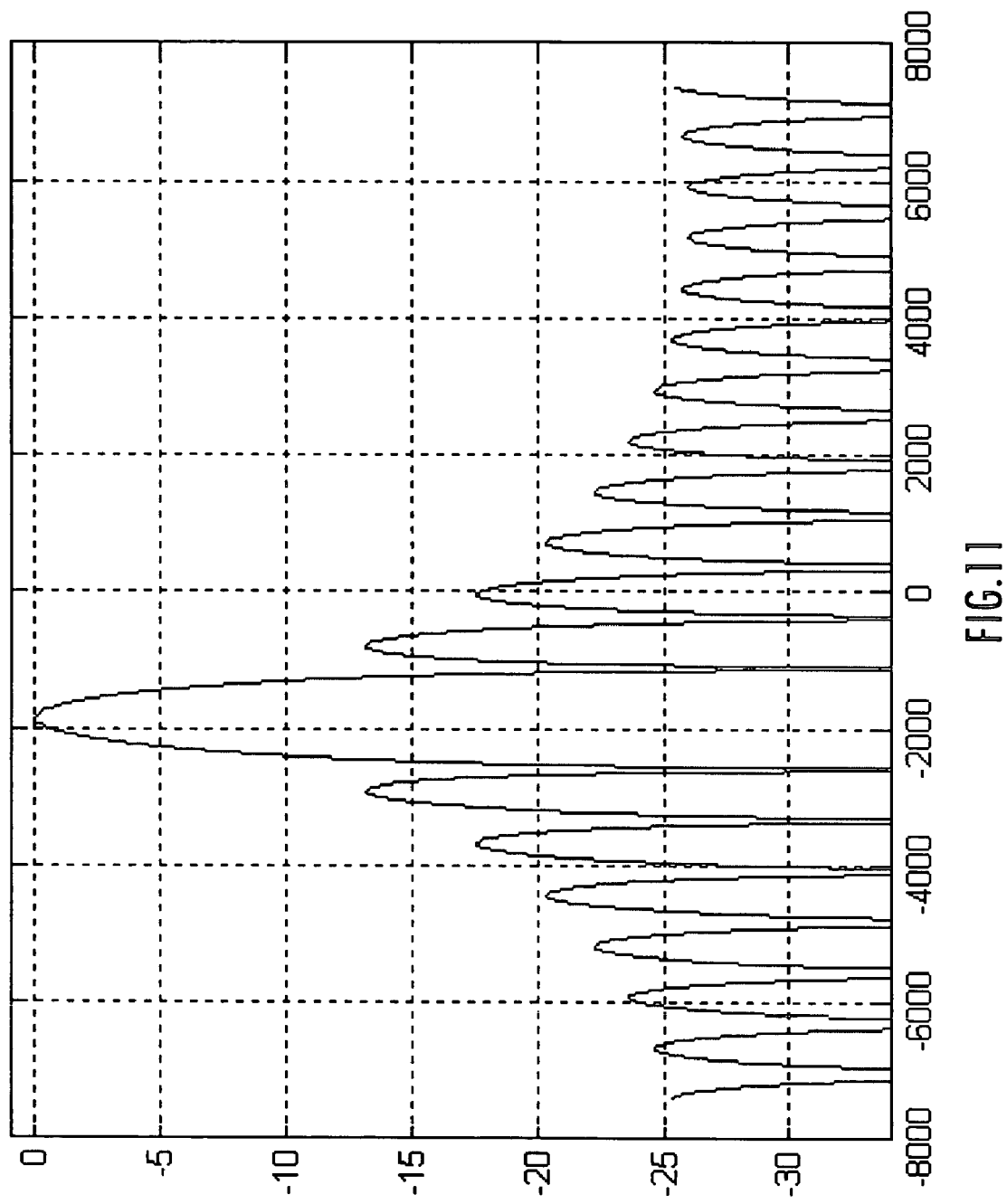
FIG. 11 is a graphical illustration of the frequency response of a low tone matched filter employed by the signal processor of FIG. 7.

The complex output values of high band filter 74 (e.g., WAVEH as viewed in FIG. 7) are provided to high tone matched filter 78. The high tone matched filter is preferably implemented by a matched filter configured to enhance the high frequency tone (e.g., +1852 Hz frequency shift within the frequency shift keying (FSK) waveform) within the matched filter output. Similarly, the complex output values of low band filter 76 (e.g., WAVEL as viewed in FIG. 7) are provided to low tone matched filter 80. The low tone matched filter is preferably implemented by a matched filter configured to enhance the low frequency tone (e.g., −1852 Hz frequency shift within the frequency shift keying (FSK) waveform) within the matched filter output. Filters 78, 80 each preferably include a length of twenty symbols or taps. The frequency response of low tone matched filter 80 is illustrated in FIG. 11 with the primary peak centered about the low frequency tone (e.g., −1852 Hz frequency shift within the frequency shift keying (FSK) waveform). The frequency response of high tone matched filter 78 is substantially similar to the low tone matched filter, except that the primary peak is shifted to be centered about the high frequency tone (e.g., +1852 Hz frequency shift within the frequency shift keying (FSK) waveform).

The high and low tone matched filters may be designed within a simulation tool (e.g., MATLAB available from The MathWorks, Inc. of Natick, Mass.). The high and low tone matched filters may be represented by the following exemplary simulation code and corresponding tap coefficients or weights (e.g., the initial tap weight is associated with a current input, while successive tap weights are respectively associated with a corresponding one of the immediately preceding nineteen inputs in time order).

High and Low Tone Matched Filter Parameters:
% Before decimation
fs=10e6/135; % sampling freq=74074.074 . . . samples/second
dh=24;
fh=10e6/5400; % high freq=1851.851 . . . Hz
fl=−10e6/5400; % low freq=−1851.851 . . . Hz
spsym=fs*67.5e-6; % samples/symbol=5
% After decimation
spsym=spsym/5; % samples/symbol=1
fs=fs/5; % sampling freq=14814.81481 . . . samples/second
sdh=round((dh-4)*spsym); % sdh=20
% Create matched filters
mtchh=(1/sdh)*exp(j*pi*[1:sdh]*fh/(fs/2));
mtchl=(1/sdh)*exp(j*pi*[1:sdh]*fl/(fs/2));

High Tone Matched Filter Tap Coefficients or Weights:
High tone matched filter

| | |
|---|---|
| Real(mtchh( 1)) = 0.03535533905932738 | Imag(mtchh( 1)) = 0.03535533905932738 |
| Real(mtchh( 2)) = −0.00000000000000001 | Imag(mtchh( 2)) = 0.05000000000000000 |
| Real(mtchh( 3)) = −0.03535533905932739 | Imag(mtchh( 3)) = 0.03535533905932736 |
| Real(mtchh( 4)) = −0.05000000000000000 | Imag(mtchh( 4)) = −0.00000000000000002 |
| Real(mtchh( 5)) = −0.03535533905932737 | Imag(mtchh( 5)) = −0.03535533905932738 |
| Real(mtchh( 6)) = 0.00000000000000004 | Imag(mtchh( 6)) = −0.05000000000000000 |
| Real(mtchh( 7)) = 0.03535533905932737 | Imag(mtchh( 7)) = −0.03535533905932738 |
| Real(mtchh( 8)) = 0.05000000000000000 | Imag(mtchh( 8)) = 0.00000000000000003 |
| Real(mtchh( 9)) = 0.03535533905932736 | Imag(mtchh( 9)) = 0.03535533905932740 |
| Real(mtchh(10)) = −0.00000000000000003 | Imag(mtchh(10)) = 0.05000000000000000 |
| Real(mtchh(11)) = −0.03535533905932740 | Imag(mtchh(11)) = 0.03535533905932736 |
| Real(mtchh(12)) = −0.05000000000000000 | Imag(mtchh(12)) = −0.00000000000000007 |
| Real(mtchh(13)) = −0.03535533905932736 | Imag(mtchh(13)) = −0.03535533905932740 |
| Real(mtchh(14)) = −0.00000000000000002 | Imag(mtchh(14)) = −0.05000000000000000 |
| Real(mtchh(15)) = 0.03535533905932733 | Imag(mtchh(15)) = −0.03535533905932742 |
| Real(mtchh(16)) = 0.05000000000000000 | Imag(mtchh(16)) = 0.00000000000000006 |
| Real(mtchh(17)) = 0.03535533905932730 | Imag(mtchh(17)) = 0.03535533905932745 |
| Real(mtchh(18)) = −0.00000000000000006 | Imag(mtchh(18)) = 0.05000000000000000 |
| Real(mtchh(19)) = −0.03535533905932738 | Imag(mtchh(19)) = 0.03535533905932737 |
| Real(mtchh(20)) = −0.05000000000000000 | Imag(mtchh(20)) = −0.00000000000000006 |

Low Tone Matched Filter Tap Coefficients or Weights:
Low tone matched filter

| | |
|---|---|
| Real(mtchl( 1)) = 0.03535533905932738 | Imag(mtchl( 1)) = −0.03535533905932738 |
| Real(mtchl( 2)) = −0.00000000000000001 | Imag(mtchl( 2)) = −0.05000000000000000 |
| Real(mtchl( 3)) = −0.03535533905932739 | Imag(mtchl( 3)) = −0.03535533905932736 |
| Real(mtchl( 4)) = −0.05000000000000000 | Imag(mtchl( 4)) = 0.00000000000000002 |
| Real(mtchl( 5)) = −0.03535533905932737 | Imag(mtchl( 5)) = 0.03535533905932738 |
| Real(mtchl( 6)) = 0.00000000000000004 | Imag(mtchl( 6)) = 0.05 000000000000000 |
| Real(mtchl( 7)) = 0.03535533905932737 | Imag(mtchl( 7)) = 0.03535533905932738 |
| Real(mtchl( 8)) = 0.05000000000000000 | Imag(mtchl( 8)) = −0.00000000000000003 |
| Real(mtchl( 9)) = 0.03535533905932736 | Imag(mtchl( 9)) = −0.03535533905932740 |
| Real(mtchl(10)) = −0.00000000000000003 | Imag(mtchl(10)) −0.05000000000000000 |
| Real(mtchl(11)) = −0.03535533905932740 | Imag(mtchl(11)) = −0.03535533905932736 |
| Real(mtchl(12)) = −0.05000000000000000 | Imag(mtchl(12)) = 0.00000000000000007 |
| Real(mtchl(13)) = −0.03535533905932736 | Imag(mtchl(13)) = 0.03535533905932740 |
| Real(mtchl(14)) = −0.00000000000000002 | Imag(mtchl(14)) = 0.05000000000000000 |
| Real(mtchl(15)) = 0.03535533905932733 | Imag(mtchl(15)) = 0.03535533905932742 |
| Real(mtchl(16)) = 0.05000000000000000 | Imag(mtchl(16)) = −0.00000000000000006 |
| Real(mtchl(17)) = 0.03535533905932730 | Imag(mtchl(17)) = −0.03535533905932745 |
| Real(mtchl(18)) = −0.00000000000000006 | Imag(mtchl(18)) = −0.05000000000000000 |
| Real(mtchl(19)) = −0.03535533905932738 | Imag(mtchl(19)) = −0.03535533905932737 |
| Real(mtchl(20)) = −0.05000000000000000 | Imag(mtchl(20)) = 0.00000000000000006 |

The complex output values from high tone matched filter 78 (e.g., TOUTH as viewed in FIG. 7) are provided to magnitude module 82, while the complex output values from low tone matched filter 80 (e.g., TOUTL as viewed in FIG. 7) are provided to magnitude module 84. Magnitude modules 82, 84 determine the magnitudes of the complex output values from the respective matched filters (e.g., the magnitude modules produce real values for the magnitudes). This enables the subsequent summation within respective pattern-matched filters 86, 88 to be non-coherent, thereby maintaining the robustness of the signal detection with respect to frequency offset. The signal detection bandwidth is set by the tone matched filters, where the −3 dB bandwidth of the filters are slightly greater than 600 Hz which significantly exceeds the 100 Hz (e.g., ±50 Hz) requirement described above.

Figure 12:
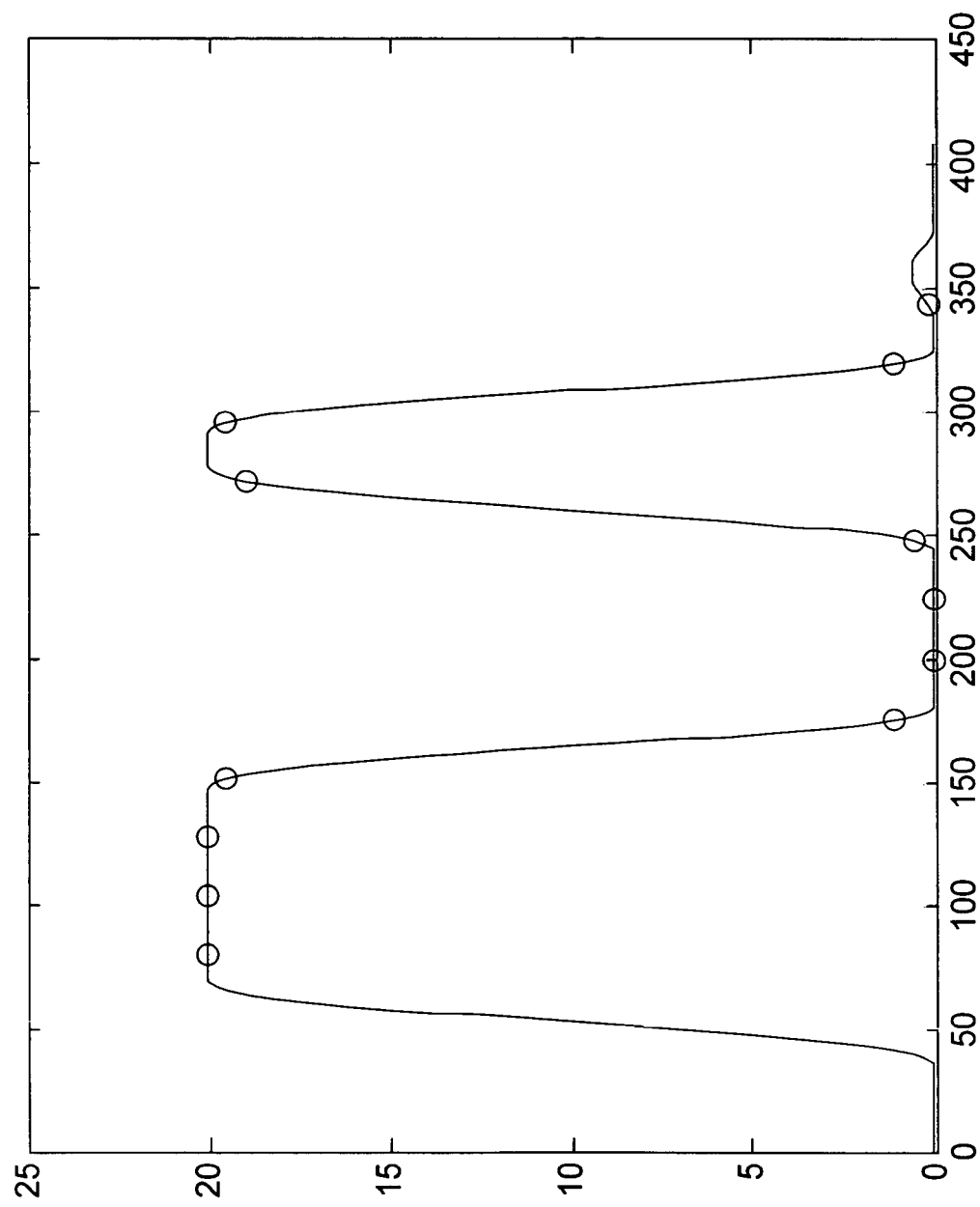
FIG. 12 is a graphical illustration of the expected output magnitudes of a high tone matched filter employed by the signal processor of FIG. 7 in the presence of the FSK sequence.

The expected waveform (without noise or interference) produced by magnitude module 82 from complex values received from high tone matched filter 78 in the presence of the FSK sequence is illustrated in FIG. 12. The points identified by the enlarged circles (e.g., as viewed in FIG. 12) are separated by twenty-four symbols and indicate the ideal sampling phase of the waveform. The expected waveform from the high tone processing path or chain includes a sequence of: four high level samples; four low level samples at an approximate zero level; two high level samples; and two low level samples at an approximate zero level. Thus, the waveform basically follows the pattern or sequence of tones or symbols within a hop (e.g., FIG. 6). In other words, since the high tone detection corresponds to the higher frequency (e.g., +1852 Hz frequency shift within the frequency shift keying (FSK) waveform) and rejects the lower frequency (e.g., −1852 Hz frequency shift within the frequency shift keying (FSK) waveform) as described above, high level samples coincide with the high tone (e.g., +1852 Hz frequency shift) portion of the pattern or sequence with the low level samples being associated with the rejected frequency portions (e.g., −1852 Hz frequency shift).

Figure 13:
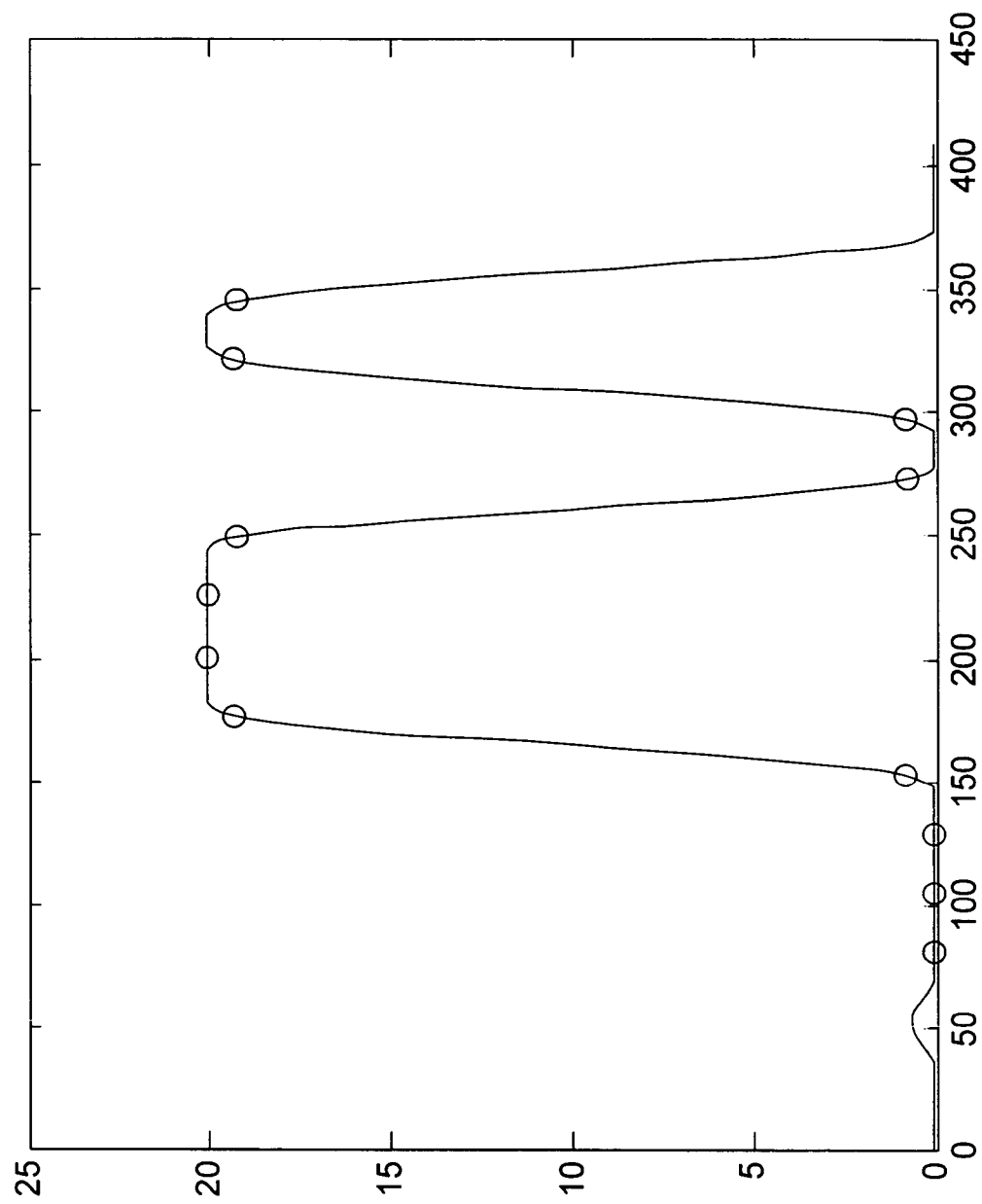
FIG. 13 is a graphical illustration of the expected output magnitudes of the low tone matched filter employed by the signal processor of FIG. 7 in the presence of the FSK sequence.

The expected waveform (without noise or interference) produced by magnitude module 84 from complex values received from low tone matched filter 80 in the presence of the FSK sequence is illustrated in FIG. 13. The points identified by the enlarged circles (e.g., as viewed in FIG. 13) are separated by twenty-four symbols and indicate the ideal sampling phase of the waveform. The expected waveform from the low tone processing path or chain is basically the inverse of the waveform of the high tone processing chain (e.g., FIG. 12) and includes a sequence of: four low level samples at an approximate zero level; four high level samples; two low level samples at an approximate zero level; and two high level samples. Thus, the waveform basically follows the pattern or sequence of tones or symbols within a hop (e.g., FIG. 6). In other words, since the low tone detection corresponds to the lower frequency (e.g., −1852 Hz frequency shift within the frequency shift keying (FSK) waveform) and rejects the higher frequency (e.g., +1852 Hz frequency shift within the frequency shift keying (FSK) waveform) as described above, high level samples coincide with the low tone (e.g., −1852 Hz frequency shift) portion of the pattern or sequence with the low level samples being associated with the rejected frequency portions (e.g., +1852 Hz frequency shift).

Figure 14:
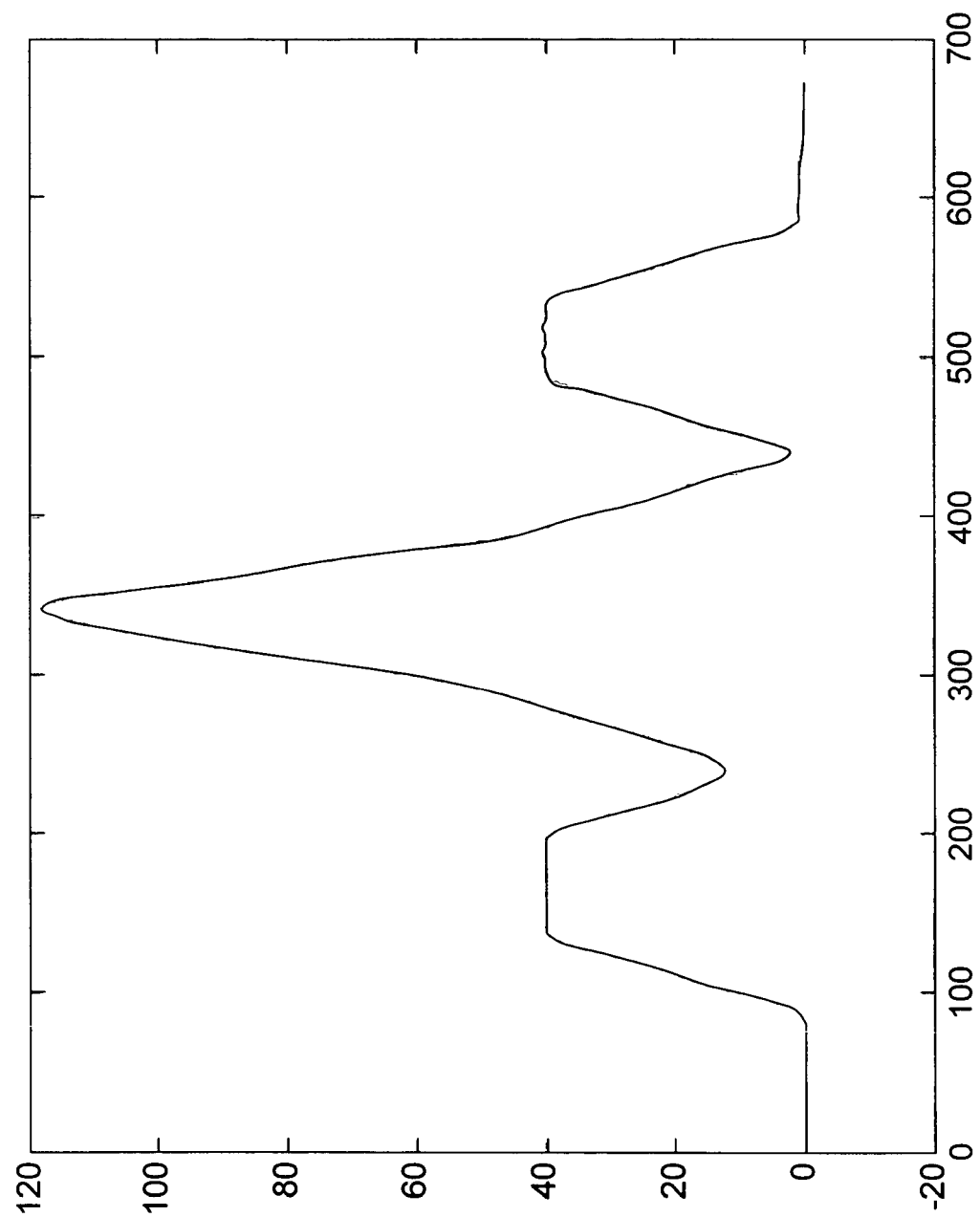
FIG. 14 is a graphical illustration of the expected output of a high frequency pattern matched filter employed by the signal processor of FIG. 7 in the presence of the FSK sequence.

The real output values from magnitude module 82 (e.g., POBSH as viewed in FIG. 7) are provided to high frequency pattern matched filter or correlator 86 and to normalize module 98. The pattern matched filter exhibits the shape of the waveform produced by magnitude module 82 with the low level samples rounded to zero and high level samples rounded to one. The filter includes a length or quantity of taps of two-hundred sixty-five with six of the taps being non-zero, where the tap coefficients are selected to produce the greatest output or peak at the location the magnitudes coincide or closely resemble an ideal waveform for the high frequency (e.g., +1852 Hz frequency shift) portion of the frequency shift keying (FSK) sequence (e.g., the ideal waveform or pattern is represented by the vector [0 0 1 1 0 0 0 0 1 1 1 1] indicating amplitudes for the sampling points identified in FIG. 12). The pattern matched filter basically compares the magnitudes to the ideal waveform. The expected output of correlator 86 in the presence of the FSK sequence is illustrated in FIG. 14. However, the filter may be designed to match or be utilized with any desired ideal waveform or pattern for a particular application.

Figure 15:
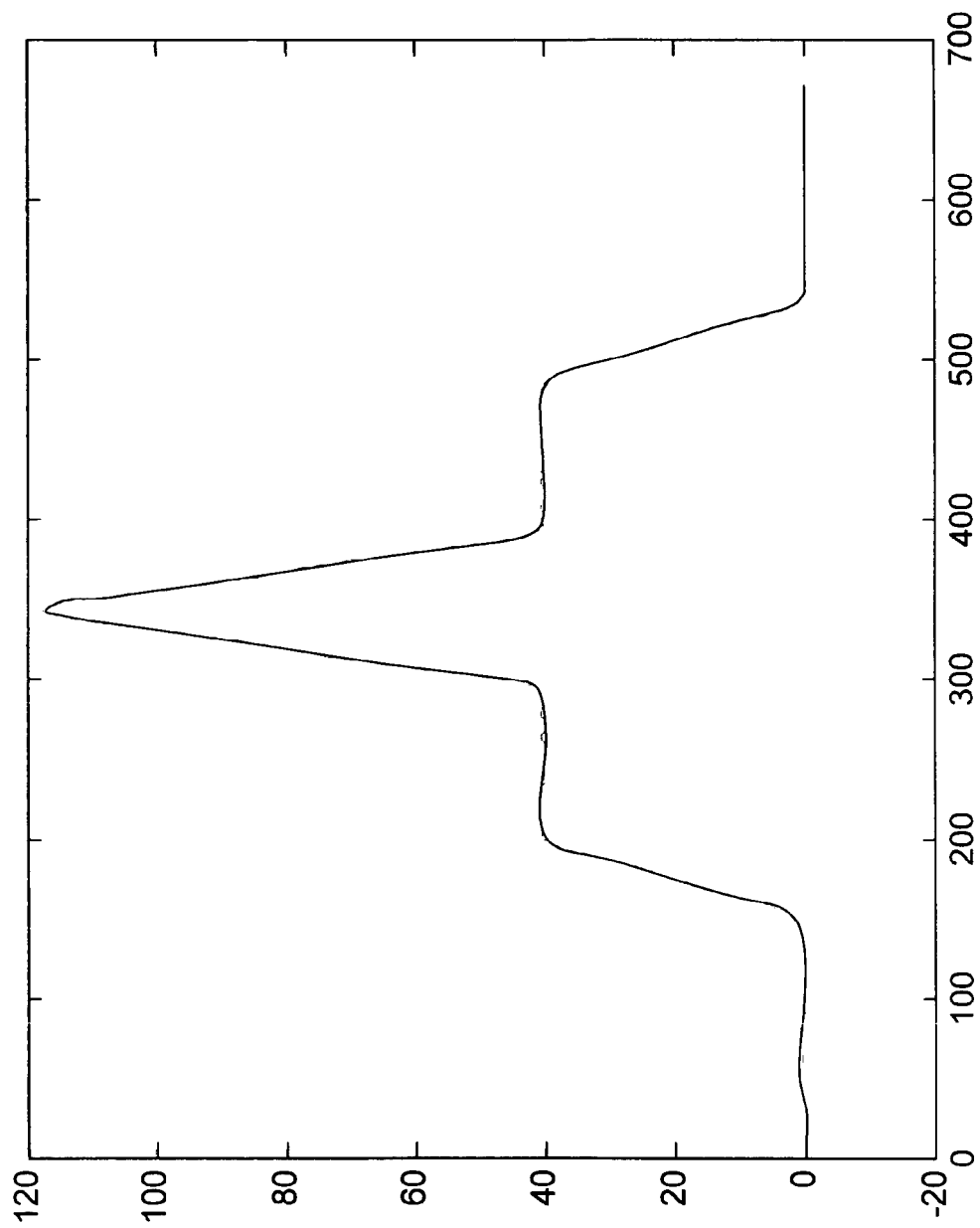
FIG. 15 is a graphical illustration of the expected output of a low frequency pattern matched filter employed by the signal processor of FIG. 7 in the presence of the FSK sequence.

The real output values from magnitude module 84 (e.g., POBSL as viewed in FIG. 7) are provided to low frequency pattern matched filter or correlator 88 and to normalize module 100. The pattern matched filter exhibits the shape of the waveform produced by magnitude module 84 with the low level samples rounded to zero and high level samples rounded to one. The filter includes a length or quantity of taps of two-hundred sixty-five with six of the taps being non-zero, where the tap coefficients are selected to produce the greatest output when the magnitudes coincide with an ideal waveform for the low frequency (e.g., −1852 Hz frequency shift) portion of the frequency shift keying (FSK) sequence (e.g., the ideal waveform or pattern is represented by the vector [1 1 0 0 1 1 1 1 0 0 0 0] indicating amplitudes for the sampling points identified in FIG. 13). The pattern matched filter basically compares the magnitudes to the ideal waveform. The expected output of correlator 88 in the presence of the FSK sequence is illustrated in FIG. 15. However, the filter may be designed to match or be utilized with any desired ideal waveform or pattern for a particular application.

The real output values from high and low frequency pattern matched filters 86, 88 (e.g., PEAKWAVEH and PEAKWAVEL as viewed in FIG. 7) are respectively provided to peak locator modules 90, 92. The correlation waveforms (e.g., FIGS. 14-15) exhibit pronounced peaks that correspond to the points where the received waveform most closely resembles (e.g., with respect to a mean square error) the expected wave shape or ideal waveform. Generally, the location of a correlation peak is searched over all times. However, in the case of the exemplary satellite application of the present invention, the time of arrival of the waveform is known within a range of ±877 μsec (e.g., corresponding to thirteen samples at a 14.8 kilosymbols per second (ksps) rate) as described above. This enables peak locator modules 90, 92 to search for the respective correlation peaks over a small window around the known time of arrival. The peak locator modules determine the largest output values of the respective correlators during this interval, where these values are considered to represent the corresponding correlation peaks.

The real output or selected samples from peak locator modules 90, 92 (e.g., PEAKOFFH and PEAKOFFL as viewed in FIG. 7) are respectively provided to region modules 94, 96. Each region module selects twelve samples from non-zero taps of a corresponding pattern matched filter 86, 88 for further processing based on the sample timing of the correlation peaks.

In order to make the processing gain invariant, the selected samples are normalized. In particular, the real output values or selected samples from region modules 94, 96 (e.g., HTESTPOINTS and LTESTPOINTS as viewed in FIG. 7) are respectively provided to normalize modules 98, 100. The samples are processed by the normalize modules as a vector, where normalized sample vectors, NPOBSL (low tone) and NOPOBSH (high tone), may be determined as follows.

$$\text{NPOBSL} = \text{POBSL}/\text{SQRT}(\text{POBSL} * \text{POBSL}') \quad \text{(Equation 1)}$$

$$\text{NPOBSH} = \text{POBSH}/\text{SQRT}(\text{POBSH} * \text{POBSH}'), \quad \text{(Equation 2)}$$

where POBSH and POBSL are the magnitudes received from magnitude modules 82, 84 corresponding to the twelve selected samples (e.g., HTESTPOINTS and LTESTPOINTS) from the high and low tone processing chains, respectively, and SQRT represents a square root function. The multiplication and prime notations (e.g., POBSL*POBSL' and POBSH* POBSH') within the equations basically represent the dot product, or the product of the row and column forms of the vector utilizing matrix multiplication. In other words, these multiplication notations basically represent the sum of the squares of each element within the respective vectors (e.g., $$\sum_{i=1}^{12} X_i^2,$$

where X represents a vector element and i equals one through twelve). Thus, the resulting normalized vectors (NPOBSL and NPOBSH) are determined by dividing each element of the corresponding sample vector (POBSL and POBSH) by the square root of the corresponding summation (e.g., sum of squared values).

An error metric is determined by measuring the Euclidean distance between the normalized samples, NPOBSH and NPOBSL, and corresponding ideal pattern matching waveforms. The Euclidean distance is ascertained by producing a difference vector between the sample and ideal vectors for each detection path (e.g., low and high tone) and subsequently performing multiplication on the row and column form of the respective difference vectors yielding corresponding distance values for those paths. Initially, normalized ideal waveform vectors, NVIDOBL and NVIDOBH (e.g., as viewed in FIG. 7), maybe determined as follows.

$$\text{NVIDOBL} = [1\ 1\ 0\ 0\ 1\ 1\ 1\ 1\ 0\ 0\ 0\ 0]/\text{SQRT}(6) \quad \text{(Equation 3)}$$

$$\text{NVDOBH} = [0\ 0\ 1\ 1\ 0\ 0\ 0\ 0\ 1\ 1\ 1\ 1]/\text{SQRT}(6) \quad \text{(Equation 4)}$$

where SQRT represents a square root function. The normalized vectors, NVIDOBL and NVIDOBH, are basically determined by dividing each ideal vector element by the square root of six and are generally predetermined and stored in signal processor 64.

The normalized sample and ideal vectors are provided to respective difference modules 102, 104 to produce resulting difference or error vectors, EVECL and EVECH (e.g., as viewed in FIG. 7), as follows.

$$\text{EVECH} = \text{NPOBSH} - \text{NVIDOBH} \quad \text{(Equation 5)}$$

$$\text{EVECL} = \text{NPOBSL} - \text{NVIDOBL}. \quad \text{(Equation 6)}$$

These equations represent vector operations, where the resulting vectors, EVECH and EVECL, are basically determined from the difference between corresponding elements in the sample and ideal vectors.

The resulting error vectors from difference modules 102, 104 are respectively provided to distance modules 106, 108 to determine the Euclidean distance values, FITMETL and FITMETH (e.g., as viewed in FIG. 7), as follows.

$$\text{FITMETH} = \text{EVECH} * \text{EVECH}' \quad \text{(Equation 7)}$$

$$\text{FITMETL} = \text{EVECL} * \text{EVECL}' \quad \text{(Equation 8)}$$

The multiplication and prime notations (e.g., EVECH * EVECH' and EVECL*EVECL') within the equations basically represent the dot product, or the product of the row and column forms of the vector utilizing matrix multiplication as described above. In other words, these multiplication notations basically represent the sum of the squares of each element within the respective vectors (e.g., $$\sum_{i=1}^{12} X_i^2,$$

where X represents a vector element and i equals one through twelve).

Since the error metrics are Euclidean distances, a lesser metric value corresponds to a better match and consequently to a higher probability of a correct detection. The error metrics, FITMETH and FITMETL, are provided to a threshold detect module 110 to compare each error metric against a corresponding threshold. A valid signal is detected in response to either metric satisfying (e.g., being less than) the corresponding threshold. Signal processor 64 of the receiver may inform modem controller 68 (FIG. 5) of the detection in order to commence processing of the incoming frequency-hopped signal by the receiver and/or modem controller.

It will be appreciated that the embodiments described above and illustrated in the drawings represent only a few of the many ways of implementing a method and apparatus for detection of a frequency coded sequence in the presence of sinusoidal interference.

The present invention signal detection may be utilized to detect a signal in any desired format (e.g., FSK, frequency coded, etc.). The signal format may include any quantity of frequency shifts, where the frequency shifts or offsets may be of any desired values, may be arranged or ordered in any fashion (e.g., alternating, etc.) and may reside in any region relative to the carrier or other signal. The frequency shifts or offsets may endure for any desired time interval (e.g., any quantity of symbol times, etc.) within the signal format. The present invention signal detection may be applied to any particular hop or quantity of hops of a frequency-hopped signal. Alternatively, the present invention signal detection may be applied to signals transmitted via any frequency hopping or shifting sequence (e.g., including any quantity of hops or shifts each enduring for any desired time interval, etc.), or via any other technique to detect a frequency coded sequence within the signal. The present invention signal detection may employ any quantity of detection paths, where each detection path may correspond to one or more frequency shifts of the formatted signal.

The present invention communication device may be applied to or in the form of any suitable communication devices (e.g., modems, receivers, transceivers, etc.), preferably employing plural tone communication techniques. The communication device or modem may employ any quantity of controllers, processors or processing devices or circuitry, where the various functions of the signal detection may be distributed in any fashion among any quantity of hardware and/or software modules, processors or other processing devices or circuits. The various communication device or modem components (e.g., receiver, transmitter, controller, etc.) may be disposed at any desired locations and arranged in any fashion.

The communication device or modem may include any quantity of any conventional or other transmitters, receivers and/or transceivers, where each transmitter or transceiver may transmit signals at any suitable frequency and in any suitable energy form (e.g., radio signals, microwave, optical, acoustic signals, etc.), and each receiver or transceiver may receive signals at any suitable frequency and in any suitable energy form (e.g., radio signals, microwave, optical, acoustic signals, etc.). The communication device or modem may include any quantity of independent transmitting and/or receiving devices, and utilize any quantity of frequency channels of any desired frequencies to send and/or receive data. The controller of the communication device or modem may be implemented by any quantity of any conventional or other microprocessor, controller or circuitry to perform any desired communication or other functions.

The communication device or modem receiver may be implemented by any quantity of any conventional or other components (e.g., down converter, signal processor, etc.). The down converter may be implemented by any conventional or other frequency conversion device to provide the carrier signal at any desired frequency (e.g., an intermediate frequency, baseband frequency, etc.) for processing. The signal processor may be implemented by any quantity of any conventional or other processor, controller and/or processing circuitry to perform the signal detection of the present invention and/or any desired communication or other functions (e.g., A/D conversion of the incoming signal, etc.). The incoming signal may be digitized within the signal processor, or the communication device may include any quantity of any conventional or other components to perform the conversion (e.g., A/D converter, etc.). The signal processor may perform the signal detection on an incoming signal at any desired frequency (e.g., carrier signal or hop frequency, intermediate frequency, baseband frequency, etc.).

The filters of the present invention (e.g., low pass, high and low band, high and low tone matched, high and low frequency matched, etc.) may be implemented by any quantity of any types of filters (e.g., matched filters, bandpass filters, low pass filters, high pass filters, etc.) providing the appropriate response for a particular application. The filters may be utilized with any desired sampling or other frequencies for a particular application. The filters may be implemented by the signal processor or other processor as digital filters, or may be implemented by circuitry as analog filters. The filters may be finite impulse (FIR) or infinite impulse (IIR) response type filters and include any quantity of taps with any desired corresponding coefficients to provide the appropriate response for an application. The filters may be designed or produced based on any desired simulation tool (e.g., MATLAB, etc.) or programming code, where the tap coefficients may be determined based on any suitable techniques (e.g., Remez, etc.).

The low pass filter may be implemented by any quantity of any conventional or other suitable filter (e.g., low pass, high pass, bandpass, etc.) and include any desired pass and stop bands for a particular application. The signal detection may reduce the sample set of the lowpass filter by any desired factor for processing. The high and low band filters may be implemented by any quantity of any conventional or other suitable filters (e.g., low pass, high pass, bandpass, etc.) to pass (or reject) any desired bands for a particular application. The high and low tone matched filters may be implemented by any quantity of any conventional or other suitable filters (e.g., low pass, high pass, bandpass, matched etc.) to pass or isolate any desired frequencies or tones for a particular application.

The signal detection may employ any conventional or other techniques to produce magnitudes of complex values. The high and low frequency pattern matched filters may be implemented by any quantity of any conventional or other suitable filters (e.g., matched, etc.) to compare a signal to any quantity of expected or ideal waveforms for a particular application. The ideal waveforms may be any suitable expected waveform represented in any desired format for a particular application. The signal detection may determine peaks in the frequency pattern matched output over any desired time intervals. The signal detection may select any quantity of samples from the determined peaks for further processing in accordance with a particular application. The signal detection may utilize any conventional or other techniques to produce normalized values with respect to any desired range. The present invention signal detection may employ any suitable distance or error measurement (e.g., Euclidean distance, etc.) to determine the presence of the sequence. The threshold may be of any quantity and set to any desired values or ranges, typically based on the desired sensitivity of the detection for a particular application. The resulting distance values or metrics may be compared to the threshold in any desired fashion (e.g., greater than, less than, etc.) to determine a detection. Further, a detection may be indicated based on any combination of the resulting values from the detection paths (e.g., any one or more of the values satisfying a corresponding threshold, averaging or weighting the resulting values and comparing each or an aggregate to a threshold, etc.).

The various functions of the signal processor (e.g., signal detection, etc.) may be distributed in any fashion among any quantity of hardware and/or software modules, processors or other processing devices or circuits (e.g., the functions may distributed in any fashion between the signal processor and controller, etc.). Further, the various signal detection functions may be distributed in any fashion among any quantity of hardware and/or software modules, processors or other processing devices or circuits. The signal processor may perform any desired mathematical operations for any types of operands (e.g., scalars, vectors, matrices, etc.). The signal detection may be performed within any suitable communication device components (e.g., receiver, controller, signal processor, etc.), or be implemented as a stand-alone processing unit within the communication device.

The software of the present invention (e.g., signal processor, signal detection, etc.) may be implemented in any suitable computer language, and could be developed by one of ordinary skill in the computer and/or programming arts based on the functional description contained herein and the diagrams illustrated in the drawings. Further, any references herein of software performing various functions generally refer to processors performing those functions under software control. The software and/or algorithms described above and illustrated in the diagrams may be modified in any manner that accomplishes the functions described herein.

The present invention may be available in the form of various communication devices (e.g., modem, receiver, transceiver, etc.), or a circuit card or processing unit for a communication device performing the signal detection described above. The present invention may alternatively be available in the form of hardware and/or software modules (e.g., card, etc.) for use on the communication device, or may be in the form of embeddable hardware and/or software modules (e.g., within another system, as an embeddable software component within other software, etc.). The present invention software (e.g., signal detection, signal processor, etc.) may be available individually, or in any combination, on a recordable medium (e.g., magnetic or optical mediums, magneto-optic mediums, floppy diskettes, CD-ROM, DVD, memory devices (e.g., cards, ROM, RAM, Flash, etc.), etc.), and/or may be downloaded (e.g., in the form of carrier waves, packets, etc.) to systems and/or communication devices via a network or other communications medium.

The present invention is not limited to the applications described above, but may be applied to any types of communications (e.g., satellite, terrestrial, wireless, underwater, etc.) to detect signals in the presence of any types of interference (e.g., sinusoidal, jamming, etc.), preferably communications employing plural tone communications in the presence of sinusoidal interference.

From the foregoing description, it will be appreciated that the invention makes available a novel method and apparatus for detection of a frequency coded sequence in the presence of sinusoidal interference, wherein independent detection paths for each of the shifted frequencies within a frequency shift keying (FSK) sequence are separately examined to detect the presence of an expected signal.

Having described preferred embodiments of a new and improved method and apparatus for detection of a frequency coded sequence in the presence of sinusoidal interference, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A communication device to detect a frequency-hopped communication signal with a frequency coded sequence embedded within said communication signal, wherein said communication signal employs a plurality of frequency hops, said communication device comprising:
   a processor to receive an incoming signal at a frequency hop of said communication signal and detect the presence of said frequency-hopped communication signal with said frequency coded sequence within said incoming signal,
wherein said communication signal includes a reference frequency to form said frequency coded sequence and said frequency coded sequence includes a first frequency shifted by a positive frequency offset from said reference frequency and a second frequency shifted by a negative frequency offset from said reference frequency, said processor including:
   a detection module to process at said frequency hop of said communication signal each said shifted frequency of said frequency coded sequence embedded within said incoming signal in a respective independent detection path, wherein said detection module includes:
   an upper frequency module to process at said frequency hop of said communication signal said first shifted frequency of said frequency coded sequence embedded within said incoming signal in a corresponding independent detection path to detect the presence of said frequency coded sequence within said first shifted frequency of said incoming signal and determine a detection of said frequency-hopped communication signal at said frequency hop in response to detecting the presence of said frequency coded sequence within said first shifted frequency of said incoming signal;
   a lower frequency module to process at said frequency hop of said communication signal said second shifted frequency of said frequency coded sequence embedded within said incoming signal in a corresponding independent detection path to detect the presence of said frequency coded sequence within said second shifted frequency of said incoming signal and determine a detection of said frequency-hopped communication signal at said frequency hop in response to detecting the presence of said frequency coded sequence within said second shifted frequency of said incoming signal; and
   a filter module to filter said incoming signal and, for each said detection path, to pass said shifted frequency of said frequency coded sequence associated with that detection path and reject remaining ones of said shifted frequencies of said frequency coded sequence associated with other detection paths.

2. The communication device of claim 1, wherein said frequency coded sequence includes a frequency shift keying (FSK) sequence.

3. The communication device of claim 2, wherein said frequency coded sequence alternates between said first frequency shifted by said positive frequency offset from said reference frequency of said communication signal and said second frequency shifted by said negative frequency offset from said reference frequency of said communication signal.

4. The communication device of claim 3, wherein said reference frequency is one of a hop frequency, an intermediate frequency and a baseband signal frequency.

5. The communication device of claim 3, wherein said upper frequency module includes:
   a high tone detection module to process said first frequency of said sequence within said incoming signal to determine a first distance value indicating the closeness of said incoming signal to an expected waveform for said first frequency within said sequence;
said lower frequency module includes:
   a low tone detection module to process said second frequency of said sequence within said incoming signal to determine a second distance value indicating the closeness of said incoming signal to an expected waveform for said second frequency within said sequence; and
said detection module further includes:
   a threshold module to compare said first and second distance values to corresponding threshold values to determine the presence of said communication signal within said incoming signal.

6. The communication device of claim 5, wherein said high tone detection module includes:
   a high band filter to reject signals at said second frequency;
   a high tone matched filter to filter signals from said high band filter and enhance signals within a range of said first frequency;
   a high frequency pattern matched filter to correlate output magnitudes from said high tone matched filter with said expected waveform for said first frequency within said sequence;
   a peak locator module to identify the greatest values within said correlation indicating locations of said incoming signal closest to said expected waveform for said first frequency; and
   a distance module to determine said first distance value based on a normalized form of selected ones of said output magnitudes corresponding to said identified correlation values and a normalized form of said expected waveform for said first frequency.

7. The communication device of claim 6, wherein said distance module determines a Euclidean distance between said normalized form of said selected output magnitudes and said normalized form of said expected waveform to produce said first distance value.

8. The communication device of claim 5, wherein said low tone detection module includes:
   a low band filter to reject signals at said first frequency;
   a low tone matched filter to filter signals from said low band filter and enhance signals within a range of said second frequency;
   a low frequency pattern matched filter to correlate output magnitudes from said low tone matched filter with said expected waveform for said second frequency within said sequence;
   a peak locator module to identify the greatest values within said correlation indicating locations of said incoming signal closest to said expected waveform for said second frequency; and
   a distance module to determine said second distance value based on a normalized form of selected ones of said output magnitudes corresponding to said identified correlation values and a normalized form of said expected waveform for said second frequency.

9. The communication device of claim 8, wherein said distance module determines a Euclidean distance between said normalized form of said selected output magnitudes and said normalized form of said expected waveform to produce said second distance value.

10. The communication device of claim 5, wherein said detection module further includes:
    a low pass filter to provide signals within a particular frequency range; and
    a decimator to reduce a sample set produced by said low pass filter for transference to said high and low tone detection modules.

11. The communication device of claim 1, wherein said communication device is at least one of a modem and a receiver.

12. A program product apparatus including a computer readable medium with computer program logic recorded thereon for detecting a frequency-hopped communication signal with a frequency coded sequence embedded within said communication signal, wherein said communication signal employs a plurality of frequency hops, wherein said communication signal includes a reference frequency to form said frequency coded sequence and said frequency coded sequence includes a first frequency shifted by a positive frequency offset from said reference frequency and a second frequency shifted by a negative frequency offset from said reference frequency, said program product apparatus comprising:
    a detection module to process, at a frequency hop of said communication signal, each said shifted frequency of said frequency coded sequence embedded within an incoming signal in a respective independent detection path, wherein said detection module includes:
    an upper frequency module to process at said frequency hop of said communication signal said first shifted frequency of said frequency coded sequence embedded within said incoming signal in a corresponding independent detection path to detect the presence of said frequency coded sequence within said first shifted frequency of said incoming signal and determine a detection of said frequency-hopped communication signal at said frequency hop in response to detecting the presence of said frequency coded sequence within said first shifted frequency of said incoming signal;
    a lower frequency module to process at said frequency hop of said communication signal said second shifted frequency of said frequency coded sequence embedded within said incoming signal in a corresponding independent detection path to detect the presence of said frequency coded sequence within said second shifted frequency of said incoming signal and determine a detection of said frequency-hopped communication signal at said frequency hop in response to detecting the presence of said frequency coded sequence within said second shifted frequency of said incoming signal; and
    a filter module to filter said incoming signal and, for each said detection path, to pass said shifted frequency of said frequency coded sequence associated with that detection path and reject remaining ones of said shifted frequencies of said frequency coded sequence associated with other detection paths.

13. The apparatus of claim 12, wherein said frequency coded sequence includes a frequency shift keying (FSK) sequence.

14. The apparatus of claim 13, wherein said frequency coded sequence alternates between said first frequency shifted by said positive frequency offset from said reference frequency of said communication signal and said second frequency shifted by said negative frequency offset from said reference frequency of said communication signal.

15. The apparatus of claim 14, wherein said reference frequency is one of a hop frequency, an intermediate frequency and a baseband signal frequency.

16. The apparatus of claim 14, wherein said upper frequency module includes:
    a high tone detection module to process said first frequency of said sequence within said incoming signal to determine a first distance value indicating the closeness of said incoming signal to an expected waveform for said first frequency within said sequence;
    wherein said lower frequency module includes:
    a low tone detection module to process said second frequency of said sequence within said incoming signal to determine a second distance value indicating the closeness of said incoming signal to an expected waveform for said second frequency within said sequence; and
    wherein said detection module further includes:
    a threshold module to compare said first and second distance values to corresponding threshold values to determine the presence of said communication signal within said incoming signal.

17. The apparatus of claim 16, wherein said high tone detection module includes:
    a high band filter module to reject signals at said second frequency;
    a high tone matched filter module to filter signals from said high band filter module and enhance signals within a range of said first frequency;
    a high frequency pattern matched filter module to correlate output magnitudes from said high tone matched filter module with said expected waveform for said first frequency within said sequence;
    a peak locator module to identify the greatest values within said correlation indicating locations of said incoming signal closest to said expected waveform for said first frequency; and
    a distance module to determine said first distance value based on a normalized form of selected ones of said output magnitudes corresponding to said identified correlation values and a normalized form of said expected waveform for said first frequency.

18. The apparatus of claim 17, wherein said distance module determines a Euclidean distance between said normalized form of said selected output magnitudes and said normalized form of said expected waveform to produce said first distance value.

19. The apparatus of claim 16, wherein said low tone detection module includes:
- a low band filter module to reject signals at said first frequency;
- a low tone matched filter module to filter signals from said low band filter module and enhance signals within a range of said second frequency;
- a low frequency pattern matched filter module to correlate output magnitudes from said low tone matched filter module with said expected waveform for said second frequency within said sequence;
- a peak locator module to identify the greatest values within said correlation indicating locations of said incoming signal closest to said expected waveform for said second frequency; and
- a distance module to determine said second distance value based on a normalized form of selected ones of said output magnitudes corresponding to said identified correlation values and a normalized form of said expected waveform for said second frequency.

20. The apparatus of claim 19, wherein said distance module determines a Euclidean distance between said normalized form of said selected output magnitudes and said normalized form of said expected waveform to produce said second distance value.

21. The apparatus of claim 16, wherein said detection module further includes:
- a low pass filter module to provide signals within a particular frequency range; and
- a decimator module to reduce a sample set produced by said low pass filter module for transference to said high and low tone detection modules.

22. A method of detecting a frequency-hopped communication signal with a frequency coded sequence embedded within said communication signal, wherein said communication signal employs a plurality of frequency hops, wherein said communication signal includes a reference frequency to form said frequency coded sequence and said frequency coded sequence includes a first frequency shifted by a positive frequency offset from said reference frequency and a second frequency shifted by a negative frequency offset from said reference frequency, and wherein each said shifted frequency within said frequency coded sequence is processed in a respective independent detection path, said method comprising:
- (a) at a frequency hop of said communication signal, filtering an incoming signal and, for each said detection path, passing said shifted frequency of said frequency coded sequence associated with that detection path and rejecting remaining ones of said shifted frequencies of said frequency coded sequence associated with other detection paths; and
- (b) processing at said frequency hop of said communication signal each said shifted frequency of said frequency coded sequence within said incoming signal in said respective independent detection path, wherein step (b) further includes:
  - (b.1) processing at said frequency hop of said communication signal said first shifted frequency of said frequency coded sequence embedded within said incoming signal in a corresponding independent detection path to detect the presence of said frequency coded sequence within said first shifted frequency of said incoming signal and determining a detection of said frequency-hopped communication signal at said frequency hop in response to detecting the presence of said frequency coded sequence within said first shifted frequency of said incoming signal;
  - (b.2) processing at said frequency hop of said communication signal said second shifted frequency of said frequency coded sequence embedded within said incoming signal in a corresponding independent detection path to detect the presence of said frequency coded sequence within said second shifted frequency of said incoming signal and determining a detection of said frequency-hopped communication signal at said frequency hop in response to detecting the presence of said frequency coded sequence within said second shifted frequency of said incoming signal.

23. The method of claim 22, wherein said frequency coded sequence includes a frequency shift keying (FSK) sequence.

24. The method of claim 23, wherein said frequency coded sequence alternates between said first frequency shifted by said positive frequency offset from said reference frequency of said communication signal and said second frequency shifted by said negative frequency offset from said reference frequency of said communication signal.

25. The method of claim 24, wherein said reference frequency is one of a hop frequency, an intermediate frequency and a baseband signal frequency.

26. The method of claim 24, wherein step (b.1) further includes:
- (b.1.1) processing said first frequency of said sequence within said incoming signal to determine a first distance value indicating the closeness of said incoming signal to an expected waveform for said first frequency within said sequence;

wherein step (b.2) further includes:
- (b.2.1) processing said second frequency of said sequence within said incoming signal to determine a second distance value indicating the closeness of said incoming signal to an expected waveform for said second frequency within said sequence; and wherein step (b) further includes comparing said first and second distance values to corresponding threshold values to determine the presence of said communication signal within said incoming signal.

27. The method of claim 26, wherein step (b.1.1) further includes:
- (b.1.1.1) filtering said incoming signal to reject signals at said second frequency and to enhance signals within a range of said first frequency;
- (b.1.1.2) correlating output magnitudes of said filtered signals with said expected waveform for said first frequency within said sequence;
- (b.1.1.3) identifying the greatest values within said correlation indicating locations of said incoming signal closest to said expected waveform for said first frequency; and
- (b.1.1.4) determining said first distance value based on a normalized form of selected ones of said output magnitudes corresponding to said identified correlation values and a normalized form of said expected waveform for said first frequency.

28. The method of claim 27, wherein step (b.1.1.4) further includes: (b.1.1.4.1) determining a Euclidean distance between said normalized form of said selected output magnitudes and said normalized form of said expected waveform to produce said first distance value.

29. The method of claim 26, wherein step (b.2.1) further includes:
- (b.2.1.1) filtering said incoming signal to reject signals at said first frequency and to enhance signals within a range of said second frequency;
- (b.2.1.2) correlating output magnitudes of said filtered signals with said expected waveform for said second frequency within said sequence;
- (b.2.1.3) identifying the greatest values within said correlation indicating locations of said incoming signal closest to said expected waveform for said second frequency; and
- (b.2.1.4) determining said second distance value based on a normalized form of selected ones of said output magnitudes corresponding to said identified correlation values and a normalized form of said expected waveform for said second frequency.

30. The method of claim 29, wherein step (b.2.1.4) further includes:
- (b.2.1.4.1) determining a Euclidean distance between said normalized form of said selected output magnitudes and said normalized form of said expected waveform to produce said second distance value.

31. The method of claim 26, wherein step (a) further includes:
- (a.1) filtering said incoming signal to provide signals within a particular frequency range and reducing a sampling set of said filtered signals for said processing of said first and second frequencies.

* * * * *